(12) United States Patent
Ferris et al.

(10) Patent No.: US 11,132,090 B2
(45) Date of Patent: Sep. 28, 2021

(54) PERIPHERAL DISPLAY DEVICES

(71) Applicant: Hewlett-Packard Development Company, L.P., Spring, TX (US)

(72) Inventors: Sara Ferris, Houston, TX (US); Dimitre Mehandjiysky, Spring, TX (US); Syed S. Azam, Spring, TX (US); Alexander Wayne Clark, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/650,001

(22) PCT Filed: Dec. 4, 2017

(86) PCT No.: PCT/US2017/064510
§ 371 (c)(1),
(2) Date: Mar. 24, 2020

(87) PCT Pub. No.: WO2019/112551
PCT Pub. Date: Jun. 13, 2019

(65) Prior Publication Data
US 2020/0293146 A1    Sep. 17, 2020

(51) Int. Cl.
*G06F 3/042* (2006.01)
*G06F 3/0484* (2013.01)

(52) U.S. Cl.
CPC ........ *G06F 3/0425* (2013.01); *G06F 3/04845* (2013.01)

(58) Field of Classification Search
CPC .. G06F 3/0425; G06F 3/04845; G06F 3/0488; G06F 3/04886; G06F 1/1639;
(Continued)

(56) References Cited

U.S. PATENT DOCUMENTS

2005/0078092 A1   4/2005  Clapper
2010/0079369 A1*  4/2010  Hartmann ........... G06F 3/04883
                                                    345/156
(Continued)

OTHER PUBLICATIONS

Chowdhary, A. et al., Laser Actuated Presentation System, Laser Actuated Presentation System, https://arxiv.org/ftp/arxiv/papers/0911/0911.5404.pdf.

*Primary Examiner* — Richard J Hong
(74) *Attorney, Agent, or Firm* — Hanley Flight & Zimmerman LLC

(57) ABSTRACT

A disclosed example method to display information from a computer system includes: accessing peripheral display information in a designated peripheral display area of a frame buffer memory in response to detecting a presence of the peripheral display information, the designated peripheral display area being a subarea of the frame buffer memory, the sub-area covering less than an entirety of a main screen of a monitor; displaying, via a peripheral information display device, the peripheral display information from the designated peripheral display area of the frame buffer memory, the peripheral information display device being separate from the main screen; determining user input coordinates based on a user interaction with the peripheral display information; updating the peripheral display information from a computer to the frame buffer memory; and displaying the updated peripheral display information from the designated peripheral display area of the frame buffer memory via the peripheral information display device.

16 Claims, 20 Drawing Sheets

(58) Field of Classification Search
CPC ...... G06F 1/1626; G06F 3/017; G06F 3/0393; G06F 3/04883; H04N 7/14; G03B 43/00
See application file for complete search history.

(56) References Cited

U.S. PATENT DOCUMENTS

| | | |
|---|---|---|
| 2011/0119638 A1 | 5/2011 | Forutanpour |
| 2011/0154233 A1 | 6/2011 | LaMarca et al. |
| 2011/0197147 A1* | 8/2011 | Fai .......................... G06F 3/017 |
| | | 715/753 |
| 2012/0038542 A1* | 2/2012 | Miyashita ............. G06F 1/1626 |
| | | 345/7 |
| 2012/0042288 A1 | 2/2012 | Liao et al. |
| 2012/0166993 A1* | 6/2012 | Anderson ............. G06F 1/1639 |
| | | 715/771 |
| 2013/0044193 A1 | 2/2013 | Kulkarni |
| 2013/0106692 A1 | 5/2013 | Maizels et al. |
| 2015/0268730 A1* | 9/2015 | Walline ................. G06F 3/0393 |
| | | 345/168 |
| 2015/0268773 A1* | 9/2015 | Sanaullah ........... G06F 3/04886 |
| | | 345/168 |
| 2016/0313816 A1* | 10/2016 | Krishnakumar ...... G06F 3/0488 |
| 2016/0378258 A1* | 12/2016 | Lyons ..................... G03B 43/00 |
| | | 345/175 |
| 2017/0099453 A1 | 4/2017 | Junuzovic et al. |
| 2017/0220234 A1 | 8/2017 | Peres et al. |
| 2018/0107249 A1* | 4/2018 | Miao ..................... G06F 1/1639 |

* cited by examiner

| CRITERIA 1404 | PROGRAM 1406 | FILE 1408 | PERIPHERAL DISPLAY(S) 1410 | |
|---|---|---|---|---|
| KeyComb [....] | SLIDES | TemplateABC.ppt | Proj1 | 1402a |
| KeyComb [....] | PHONE | | DirectView1 | 1402b |
| WndProp [....] | CALENDAR | | DirectView2 | 1402c |
| ProgInit [....] | MUSIC | | DirectView3 | 1402d |
| ProgInit [....] | IM | | DirectView1,2 | 1402e |
| ProgInit [....] | NOTIFICATIONS | | DirectView1,2,3 | 1402f |
| Hotzone | ART | | Proj1 | 1402g |

PERIPHERAL DISPLAY INFORMATION
DETECTION DEFINITIONS

FIG. 14

PERIPHERAL DISPLAY DEVICES

BACKGROUND

Desktop and laptop computers typically include a main processing unit connected to a display. On desktop computers, the display can be connected to the main processing unit via a cable and/or the main processing unit may be designed into a monitor housing of the display. In laptop computers, the display can be mounted to a main processing unit portion via a hinge such that the display and the main processing unit form a clam shell form factor. In some instances, a secondary display may be connected to a desktop computer and/or a laptop computer. In some such instances, the secondary display can display an exact replica of the entirety of the contents displayed on the primary display of the desktop and/or laptop. In other instances, the secondary display is configured to operate in an extended desktop mode in which the secondary display operates as an extended desktop area that does not overlap with the primary display. As such, in an extended desktop mode, the secondary display presents only what is moved or dragged onto the desktop portion of the secondary display without overlapping with the primary display.

BRIEF DESCRIPTION OF THE DRAWINGS

FIG. 14 is an example data structure that stores peripheral display information detection definitions that define criteria that trigger displaying of peripheral display information via peripheral display devices.

Figure 1:
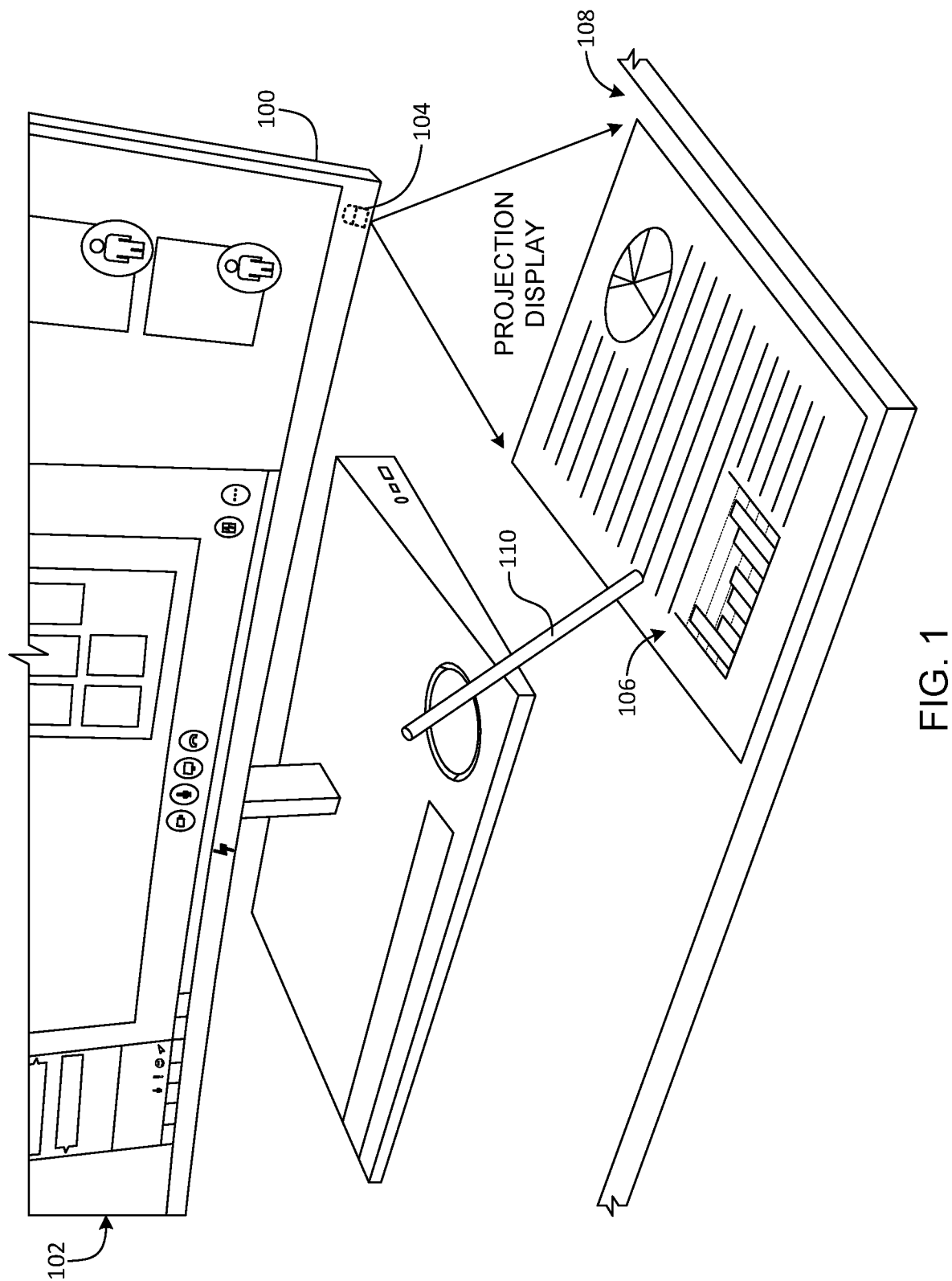
FIG. 1 is an example monitor having a main display and an example built-in peripheral display device to project peripheral display information in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.)

another part, indicates that the referenced part is either in contact with the other part, or that the referenced part is above the other part with intermediate part(s) located therebetween. Stating that any part is in contact with another part means that there is no intermediate part between the two parts.

DETAILED DESCRIPTION

Examples disclosed herein may be used to implement peripheral display devices for use with processor systems. Examples disclosed herein augment the display experience and user interaction aspects of computing via multiple device form factors (e.g., desktop computers, laptops, tablets, mobile phones, etc.) by expanding the visual real estate for displaying and interacting with display information. This is achieved through rendering display information using peripheral information display devices that are in communication with a processor system and separate from a main display of the processor system. Such peripheral information display devices may be implemented using projector devices capable of projecting display information onto surfaces (e.g., a user's physical tabletop/desktop surface, a nearby physical wall, a nearby physical projection screen, etc.). Peripheral information display devices may additionally or alternatively be implemented using direct-view displays such as liquid crystal displays (LCDs) (e.g., transmissive and/or transflective LCDs with backlighting and/or reflective LCDs), light emitting diode (LED) displays, organic LED (OLED) displays, electronic ink (e-ink) displays, etc. In examples disclosed herein, display information rendered on peripheral display devices is referred to as peripheral display information. In some examples, such peripheral display information overlaps with display information that is simultaneously displayed on a main screen of a monitor in circuit with a host processor system. In the same or other examples, such peripheral display information may not overlap with display information that is simultaneously displayed on the main screen.

Examples disclosed herein enable real-time interaction with the peripheral display information by enabling touch-based inputs and/or pen/stylus-based inputs corresponding to the peripheral display information. The real-time interaction is implemented by providing the touch-based inputs and/or pen-based inputs to the host processor system in real time to update contents corresponding to the peripheral display information and, in turn, update the presented peripheral display information in accordance with the touch-based inputs and/or pen-based inputs. This provides a rich and seamless input/output experience for controlling, modifying, and/or interacting with displayed information. As described in detail below, examples disclosed herein set forth a number of peripheral display configurations and techniques for detecting, generating, displaying, and/or interacting with peripheral display information via peripheral information display devices. The disclosed examples can be used for displaying and interacting with peripheral display information sourced by a local host processor system and/or sourced by a remote host processor system that is in network communication with the local host processor system. Such implementations may be useful for interacting between different parties and/or computers via web conferencing applications, remote desktop protocol (RDP) applications, virtual network computing (VNC) applications, remote technical support applications, etc.

Figure 12:
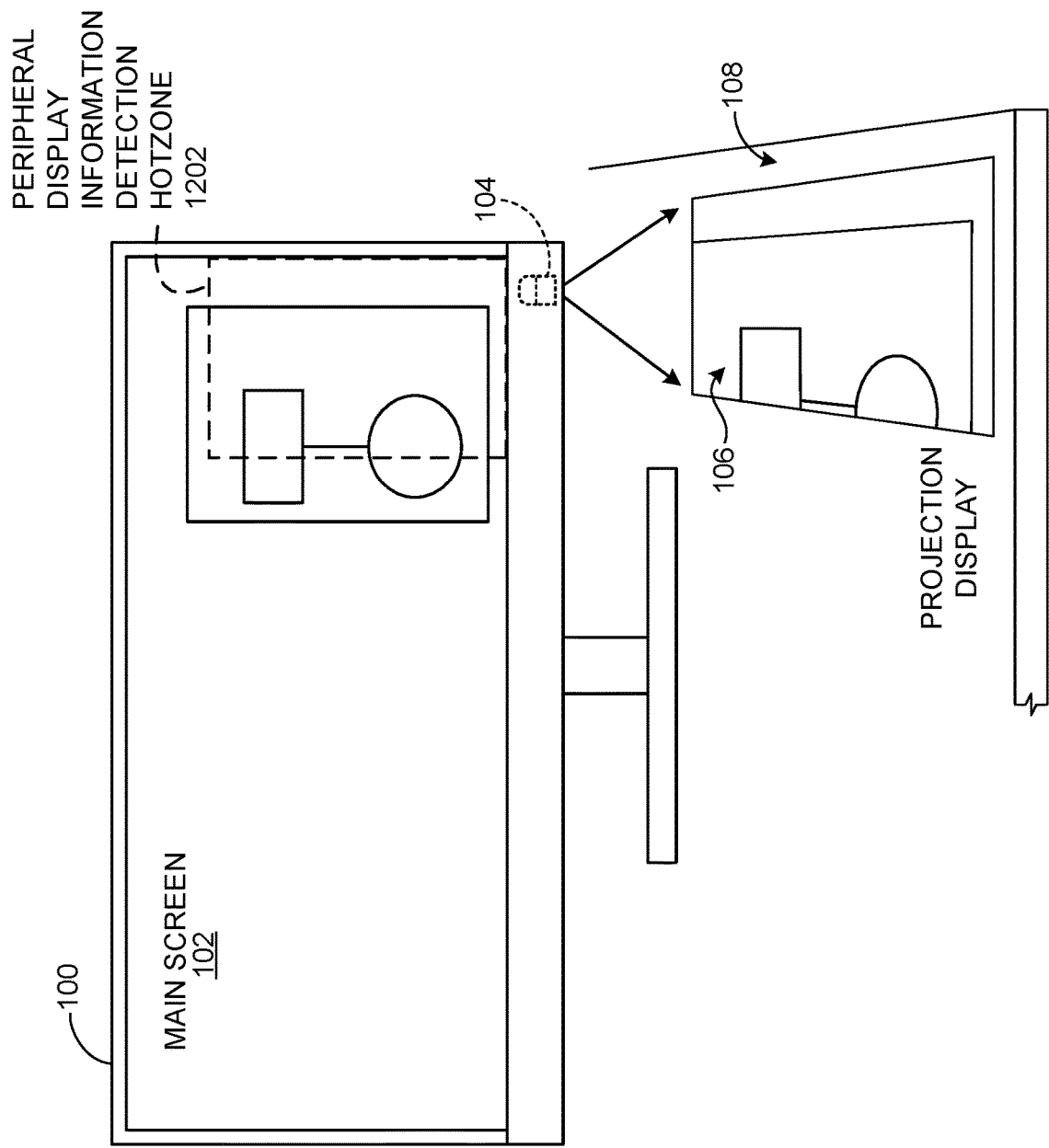
FIG. 12 is an example peripheral display information detection hotzone on a main screen of the example monitor of FIGS. 1-4, 5A, 5B, and 8-11 that may be used to detect peripheral display information on the main screen.
Figure 13:
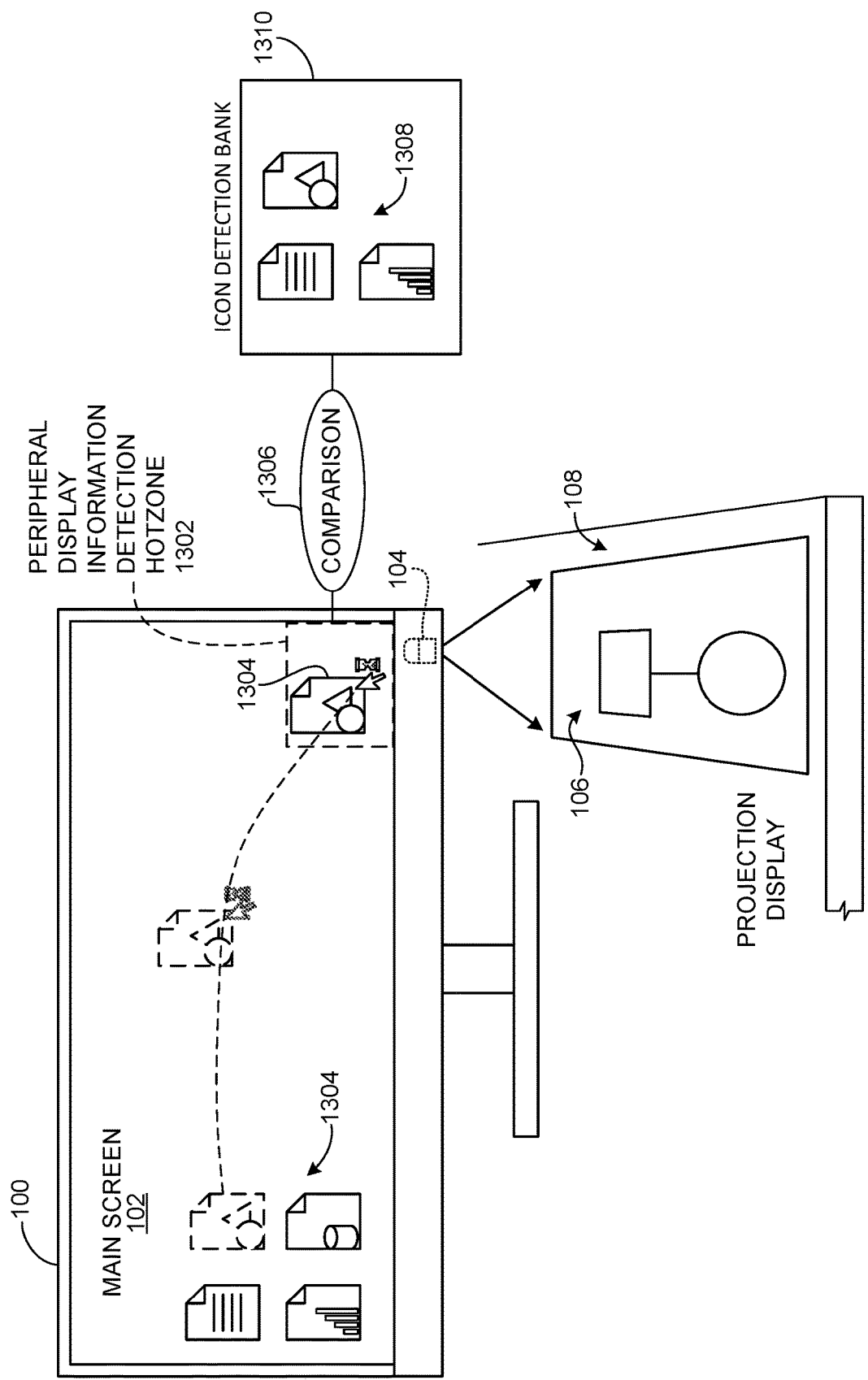
FIG. 13 is another example peripheral display information detection hotzone on the main screen of the example monitor of FIGS. 1-4, 5A, 5B, and 8-11 that may be used to detect peripheral display information based on icons corresponding to computer files.

FIG. 1 is an example monitor 100 having a main screen 102 and an example built-in peripheral display device in the form of an example built-in projector 104. The example built-in projector 104 projects peripheral display information 106 onto a surface 108 of, for example, a physical tabletop surface or a physical desktop surface on which the monitor 100 is located. The peripheral display information 106 may be information that is also displayed in a portion that is less than the entirety of the main screen 102. For example, the peripheral display information 106 may be display information that, when placed in a peripheral display information detection hotzone on the main screen 102 as described below in connection with FIGS. 12 and 13, is projected by the built-in projector 104 onto the surface 108. Alternatively or additionally, the peripheral display information 106 may be displayed by the built-in projector 104 based on detecting the presence or existence of criteria that satisfy a peripheral display information detection definition as described below in connection with FIG. 14.

The illustrated example of FIG. 1 includes an example pen or stylus 110 that may be used to interact with the peripheral display information 106. Examples of such interactions include controlling content of the peripheral display information 106 and digitally inking on or digitally marking up content of the peripheral display information 106. Such digital inking or marking facilitates implementing a paperless environment in which the need for printing paper copies of computer documents can be significantly reduced or eliminated, thereby saving on business overhead costs related to purchasing paper products and promoting a healthier environment by reducing paper waste. In addition, using projection and user-interaction techniques for controlling and/or modifying the peripheral display information 106 as disclosed herein reduces desk clutter that could arise from using a separate inking tablet connected to a host computer system as a peripheral. Unlike separate peripheral inking tablets that occupy space regardless of whether it is being used, examples of projecting peripheral display information 106 disclosed herein reduce such clutter because when the peripheral display information 106 is not being projected, the projection surface 108 is useable surface area by a user for other purposes.

Figure 2:
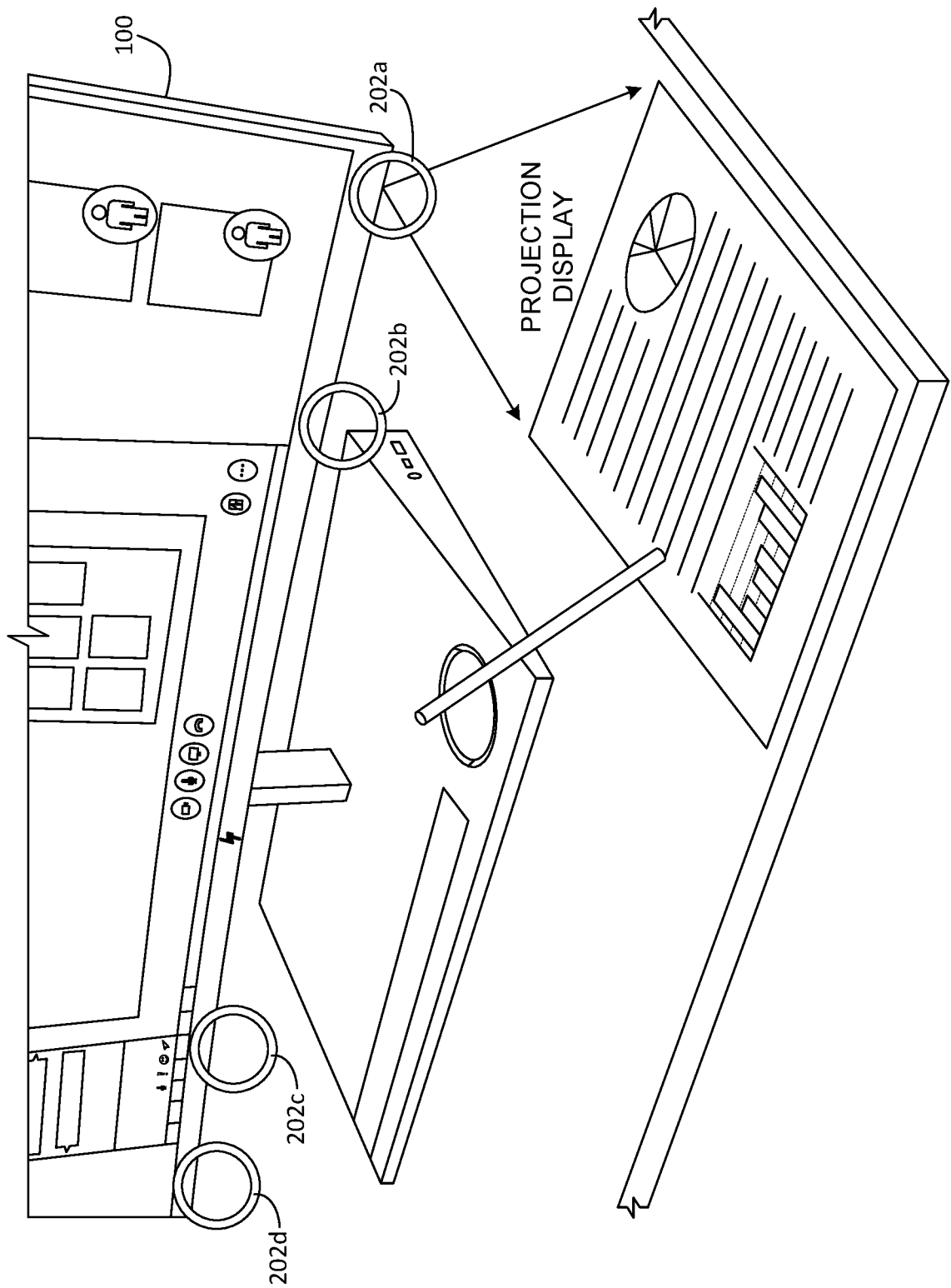
FIG. 2 illustrates a plurality of integration points at which the example monitor of FIG. 1 may be provided with example front-mounted built-in peripheral display devices in the form of projectors.

The example built-in projector 104 is mounted, recessed, or otherwise designed into the housing of the monitor 100. In the illustrated example, a single built-in projector 104 is provided at a particular location in the housing of the monitor 100. In other examples, the built-in projector 104 may be provided at a different location and/or multiple built-in projectors substantially similar or identical to the built-in projector 104 may be built into the monitor 100. For example, FIG. 2 illustrates a front-projection peripheral display configuration in which a plurality of integration points 202a-d at which example front-mounted built-in peripheral display devices in the form of projectors may be built into the example monitor 100 along a bottom periphery of a housing of the monitor 100. In some examples, in addition to or instead of front-mounted built-in projectors as shown in FIGS. 1 and 2, rear-mounted built-in projectors may be built into the housing of the monitor as shown in an example rear-projection peripheral display configuration of FIG. 3. In the illustrated example of FIG. 3, a plurality of integration points 302a-f are shown along top and bottom peripheries of the housing of the monitor 100 at which example rear-mounted built-in peripheral display devices in the form of projectors may be located. In multiple projector configurations such as the configurations shown in FIGS. 2 and 3, a user may configure a dedicated application (e.g., a dialer for a communications application, a calendar application, a music application, a notifications center, etc.) to always display its user interface via a pre-selected built-in projector when such built-in projector is present and available. If the pre-selected built-in projector is not present and/or not available, the user interface of the application defaults back for display via the main screen 102.

Figure 3:
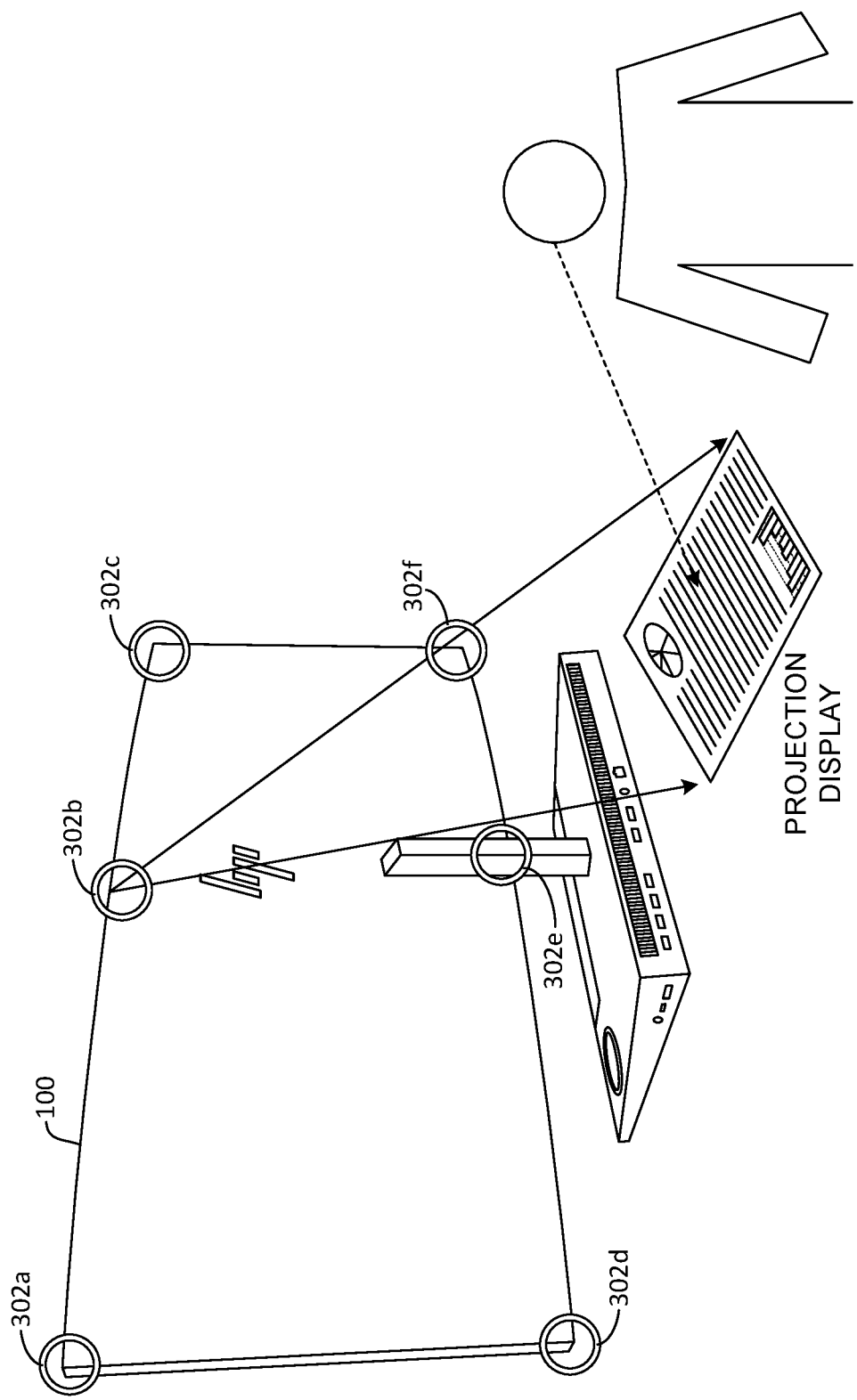
FIG. 3 illustrates a plurality of integration points at which the example monitor of FIGS. 1 and 2 may be provided with example rear-mounted built-in peripheral display devices in the form of projectors.
Figure 4:
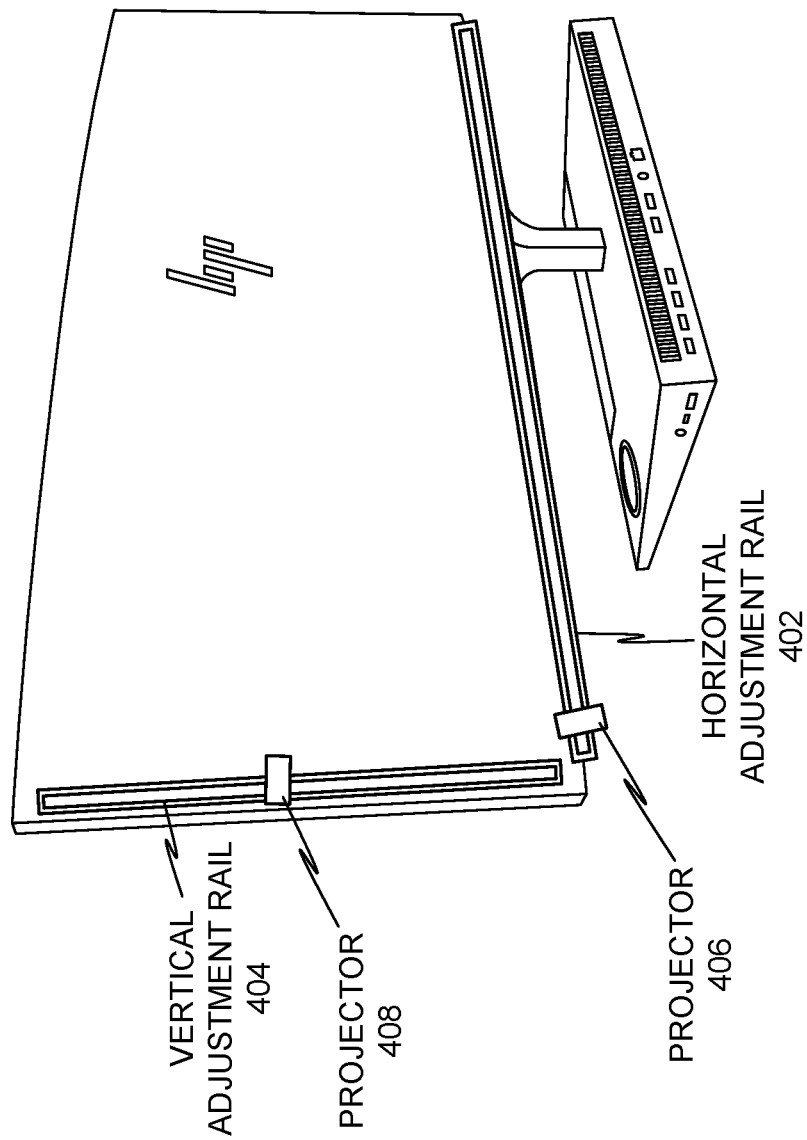
FIG. 4 illustrates a rail-based projector-position adjustment system that enables moving peripheral display projectors along horizontal and/or vertical adjustment rails mounted on the example monitor of FIGS. 1 and 2.

FIG. 4 illustrates an example rail-based projector-position adjustment system that enables horizontally and/or vertically moving peripheral display projectors to adjust where peripheral display information is projected. To enable such horizontal and/or vertical adjustments, an example horizontal adjustment rail 402 and/or an example vertical adjustment rail 404 are mounted along corresponding horizontal and vertical peripheries of the example monitor of FIGS. 1-3. In the illustrated example, a horizontal peripheral display projector 406 can be moved along the horizontal adjustment rail 402 and/or a vertical peripheral display projector 408 can be moved along the example vertical adjustment rail 404. In some examples, the peripheral display projectors 406, 408 are configured to be moved manually along the adjustment rails 402, 404. Additionally or alternatively, the peripheral display projectors 406, 408 are configured to be electromechanically moved along the adjustment rails 402, 404 using, for example, a linear motor, an acme screw linear actuator, a belt-driven linear actuator, and/or any other suitable linear actuator. In such examples, electromechanical movement may be controlled using user-operable buttons on the monitor 100 and/or software-based graphical user interface (GUI) controls displayed on the monitor 100. In some examples, the horizontal adjustment rail 402 is joined to the vertical adjustment rail 404 to form a continuous rail path, and a single peripheral display projector is provided that can be moved anywhere along a horizontal travel or a vertical travel of the continuous rail.

In some examples, peripheral display projectors mounted at any of the integration points 302a-f of FIG. 3 and/or on either of the adjustment rails 402, 404 of FIG. 4 may be used as ambient lighting. For example, hardware and/or a program running on the monitor 100 and/or on a host processor system (e.g., the host processor system 1606 of FIG. 16) may be configured and used to control color, color intensity, brightness, alternating color patterns, etc. of light projected by the peripheral display projectors. Such features could be used to enhance viewability and viewing comfort (e.g., for purposes of ergonomics) of information on the main screen 102 by projecting visually comfortable background light. Such features could also be used for entertainment such as synchronizing light blinking, color and color pattern projection based on music playback by the host processor system and/or an external music source.

Figure 5A:
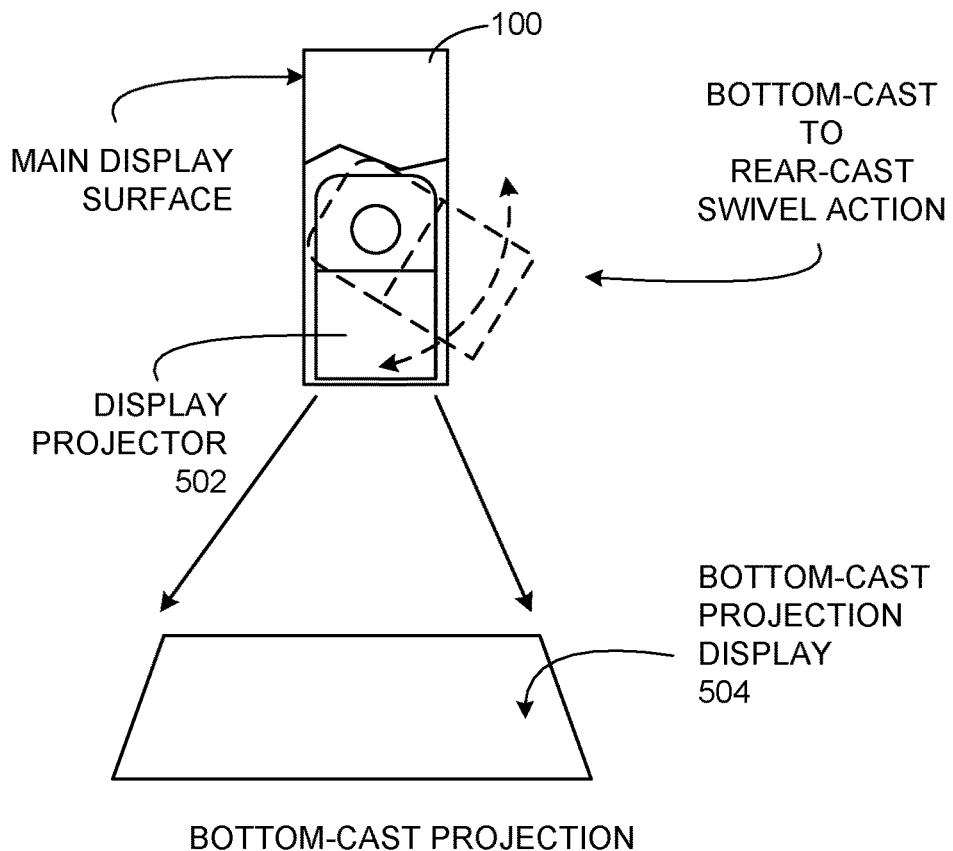
FIGS. 5A and 5B illustrate an example projector-swivel configuration that may be used to adjust a projection direction of the example peripheral display projectors of FIGS. 1-4.
Figure 5B:
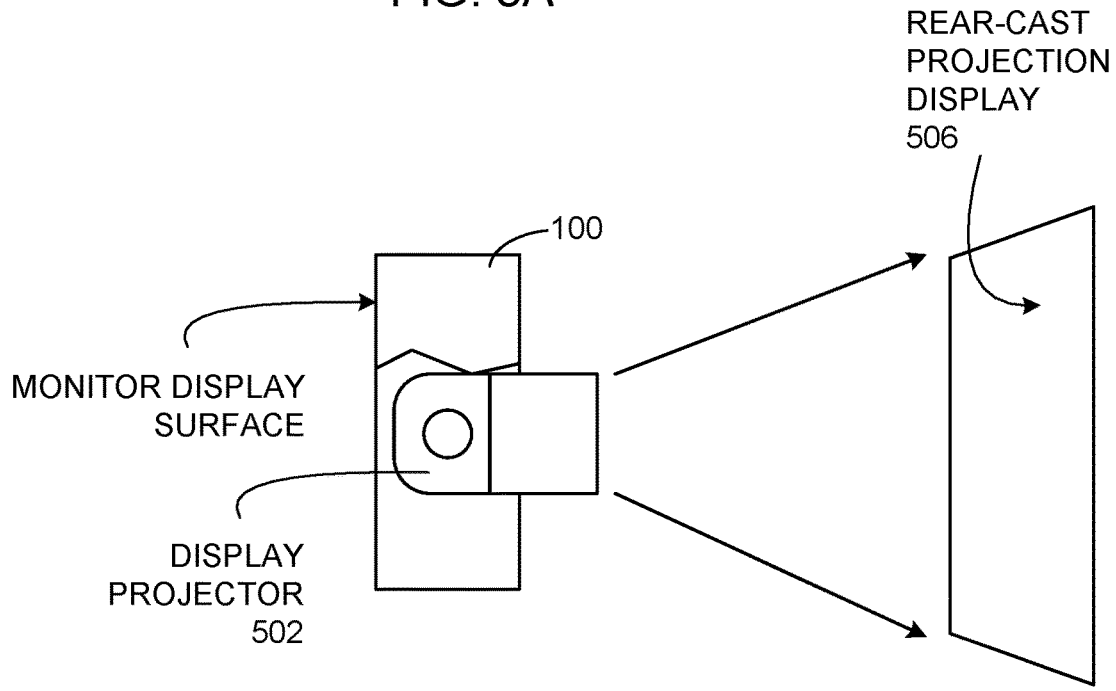

In any of the examples of FIGS. 1-4, the peripheral display projectors may be pivotally mounted to enable a swivel action of the peripheral display projectors for coarse-grain and/or fine-grain adjustment of a projected image. Such adjustment may be used to adjust the projected image to compensate for instances in which a user tilts the monitor 100 to adjust for viewability of the main screen 102. For example, as the monitor 100 is tilted up or down, the repositioned tilt angle of the monitor also moves the tilt of the peripheral display projector 104 which distorts how the projected peripheral display information 106 is cast on the surface 108. The swivel-based adjustment of the peripheral display projector 104 may also be used to change where peripheral display information is projected. For example, FIGS. 5A and 5B illustrate an example projector-swivel configuration that may be implemented in connection with the monitor 100 to adjust a projection direction of the example peripheral display projectors of FIGS. 1-4. The illustrated example of FIG. 5A shows an example swivel-enabled peripheral display projector 502 in a downward pointing position to create a bottom-cast peripheral display projection 504. The illustrated example of FIG. 5B shows the example swivel-enabled peripheral display projector 502 in a rearward pointing position to create a rear-case peripheral display projection 506. In some examples, the swivel-enabled peripheral display projector 502 is swiveled manually by a user. Additionally or alternatively, the swivel-enabled peripheral display projector 502 is swiveled using an electromechanical adjustment system (e.g., a motor, a lever, a solenoid, etc.).

In examples disclosed herein, any suitable display correction features may be implemented for use with the peripheral display projectors of FIGS. 1-4, 5A, and 5B. One such display correction feature includes automatic keystoning to adjust the projected image to compensate for different projection angles so that projections appear square rather than trapezoidal to users. Other display correction features include automatic color adjustment, automatic brightness adjustment, automatic contrast adjustment, automatic sharpness adjustment, etc.

Figure 6:
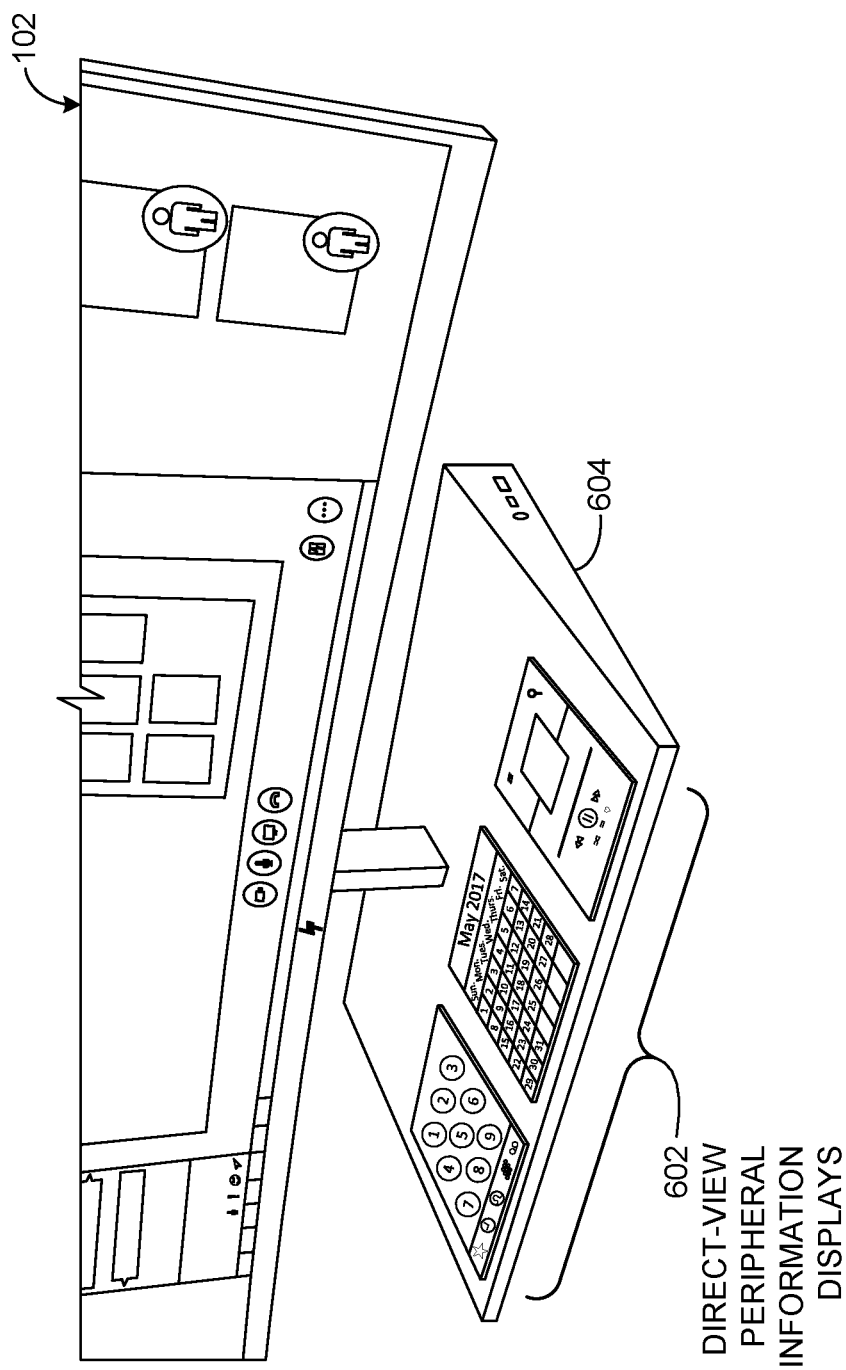
FIG. 6 illustrates example peripheral information displays built into a monitor base to present peripheral display information in accordance with the teachings of this disclosure.

FIG. 6 illustrates example direct-view peripheral displays 602 built into a monitor base 604 to present peripheral display information. In the illustrated example, the direct-view peripheral displays 602 are low-resolution displays (e.g., approximately 75 pixels-per-inch (ppi) to 200 ppi) to display low-resolution peripheral display information. However, in other examples, the direct-view peripheral displays 602 may be high-resolution displays (e.g., approximately 200 ppi to 450 ppi) and/or a mix of low-resolution displays and high-resolution displays. The direct-view peripheral displays 602 may be implemented using any suitable direct-view display technology that a user views directly including, for example, LCDs (e.g., transmissive and/or transflective LCDs with backlighting and/or reflective LCDs), LED displays, OLED displays, e-ink displays, etc. In some examples, the direct-view peripheral displays 602 are provided with touch panel capabilities and/or pen/stylus interface capabilities to enable users to interact with peripheral display information rendered thereon using touch-based user inputs and/or pen/stylus-based user inputs.

The example direct-view peripheral displays 602 enable displaying programs GUIs so that such GUIs can be continuously accessible via the direct-view peripheral displays 602 even when other program GUIs are displayed on the main screen 102 of the monitor 100. As such, the direct-view peripheral displays 602 reduce clutter on the main screen 102 and promote increased productivity of users by making more space available on the main screen 102 for programs other than those displayed on the direct-view peripheral displays 602. In the illustrated example, one of the direct-view peripheral displays 602 renders a telephone user interface (e.g., a voice over internet protocol (VOIP) communications program), another one of the direct-view peripheral displays 602 renders a calendar user interface, and another one of the direct-view peripheral displays 602 renders a music control user interface. A user and/or a computing system may select or define what information or programs (apps) to display on the example direct-view peripheral displays 602. For example, the direct-view peripheral displays 602 may display peripheral display information based on detecting the presence or existence of criteria that satisfy peripheral display information detection definitions as described below in connection with FIG. 14. In such examples, the peripheral display information detection definitions specify particular ones of the direct-view peripheral displays 602 that are to display different information/programs. Alternatively or additionally, the peripheral displays 602 may render peripheral display information that, when placed in a peripheral display information detection hotzone on the main screen 102 as described below in connection with FIGS. 12 and 13, is also displayed on one of the direct-view peripheral displays 602. In such examples, multiple hotzones may appear on the main screen 102 enabling a user to drag/place different information/programs in different ones of the hotzones for displaying on corresponding ones of the direct-view peripheral displays 602.

Figure 7:
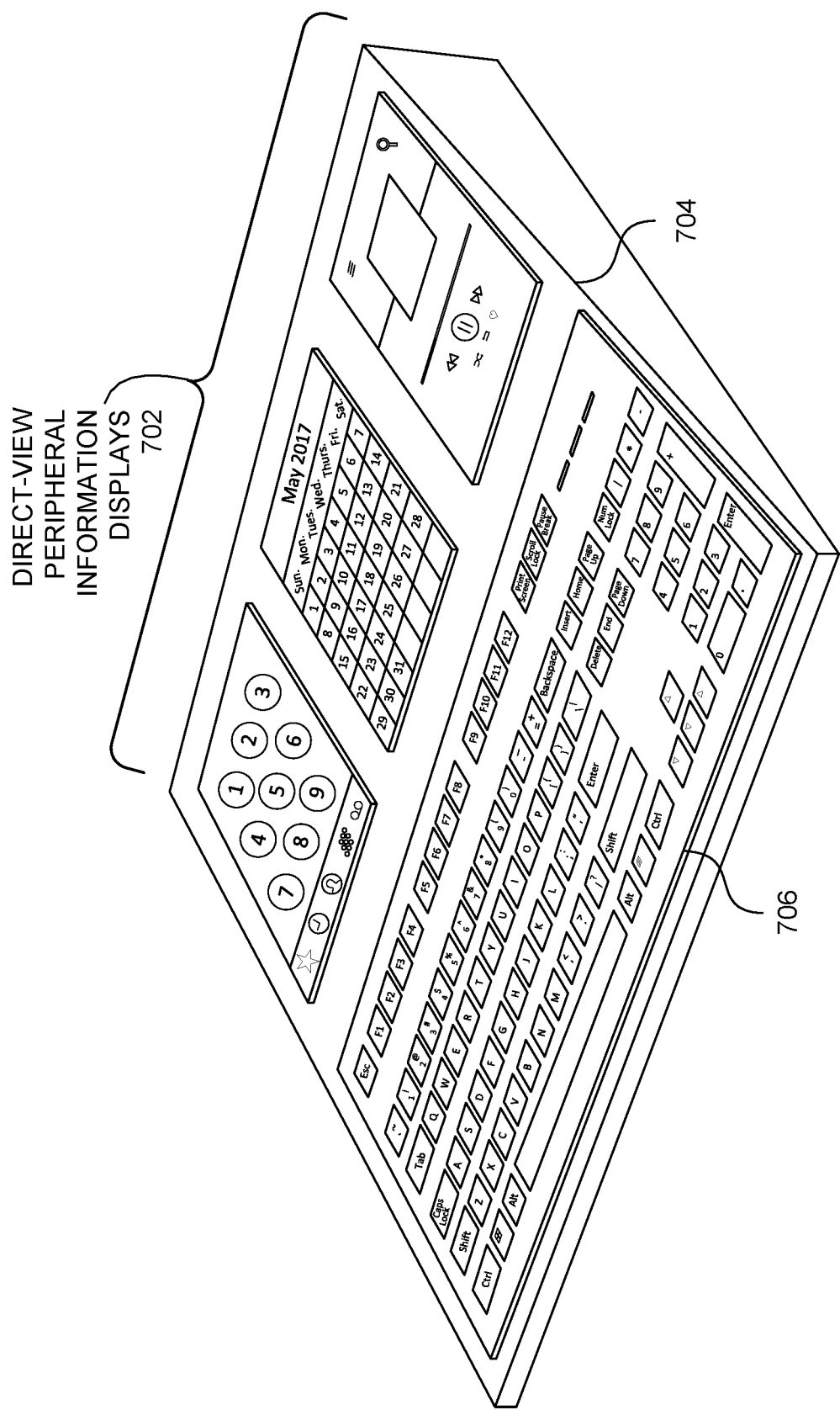
FIG. 7 illustrates example peripheral information displays built into a keyboard housing to present peripheral display information in accordance with the teachings of this disclosure.

FIG. 7 illustrates example direct-view peripheral displays 702 built into a keyboard housing 704 to present peripheral display information. The direct-view peripheral displays 702 of the illustrated example are substantially similar or identical to the direct-view peripheral displays 602 of FIG. 6. In the illustrated example, the direct-view peripheral displays 702 are built into the keyboard housing 704 to be juxtaposed to a top side of keyboard keys 706 opposite a bottom side of the keyboard keys 706 at which a user would be positioned to type on the keyboard keys 706. In the illustrated example physical configuration, a user could reach over the keyboard keys 706 toward the direct-view peripheral displays 702 to interact with peripheral display information rendered on the direct-view peripheral displays 702. In some examples, the direct-view peripheral displays 702 on the keyboard housing 704 could be provided in computing systems instead of the peripheral displays 602 mounted on the monitor base 604 as shown in FIG. 6. Alternatively, the direct-view peripheral displays 702 could be provided in computing systems in addition to the peripheral displays 602 mounted on the monitor base 604. In such examples, the computing system is configured to display corresponding peripheral display information on corresponding ones of the direct-view peripheral displays 602, 702 using any suitable technique including example hotzone-based techniques described below in connection with FIGS. 12 and 13 and peripheral display information detection definitions described below in connection with FIG. 14.

By building the example direct-view peripheral displays 602, 702 into the monitor base 604 as shown in FIG. 6 and/or into the keyboard housing 704 as shown in FIG. 7, space already occupied by the monitor base 604 and/or the keyboard housing 704 is re-purposed for the direct-view peripheral displays 602, 702. In this manner, the need for additional desk space for separate peripheral displays tethered to a host processor system can be substantially reduced or eliminated. However, although the direct-view peripheral displays 602, 702 are shown in FIGS. 6 and 7 as built into housings of other computing peripherals (e.g., the monitor 100 and/or the keyboard housing 704), in other examples, direct-view peripheral displays may be provided in a separate housing and communicatively coupled with a host computing system (e.g., via universal serial bus (USB) and/or any suitable video connection such as an HDMI (High-Definition Multimedia Interface) connection, a display port connection, a video graphics array (VGA) connection, etc.) for use in displaying peripheral display information in accordance with the teachings of this disclosure.

The example direct-view peripheral displays 602, 702 may be turned on or off manually and/or automatically. For example, to manually turn on/off the direct-view peripheral displays 602, 702, separate on-off hardware buttons (e.g., substantially similar or identical to the peripheral display on-off hardware button 904 of FIG. 9) may be provided proximate to corresponding ones of the direct-view peripheral displays 602, 702 to turn on/off individual ones of the direct-view peripheral displays 602, 702. Alternatively, a single hardware button for all of the direct-view peripheral displays 602, 702 may be provided on the monitor base 604 or on the keyboard housing 704 to turn on/off all of the direct-view peripheral displays 602 on the monitor base 604 or to turn on/off all of the direct-view peripheral displays 702 on the keyboard housing 704. Additionally or alternatively, soft buttons may be displayed on the main screen 102 of the monitor 100 for selection by a user to turn on/off the direct-view peripheral displays 602, 702. In yet other examples, the direct-view peripheral displays 602, 702 may be automatically turned on/off based on capabilities to automatically detect peripheral display information that is to be rendered by the direct-view peripheral displays 602, 702. For example, the direct-view peripheral displays 602, 702 may be automatically turned on based on detecting that peripheral display information that is to be displayed by the direct-view peripheral display(s) 602, 702 is placed in a peripheral display information detection hotzone on the main screen 102 as described below in connection with FIGS. 12 and 13. Alternatively or additionally, the direct-view peripheral displays 602, 702 may be automatically turned on based on detecting the presence or existence of criteria that satisfy a peripheral display information detection definition as described below in connection with FIG. 14.

Figure 8:
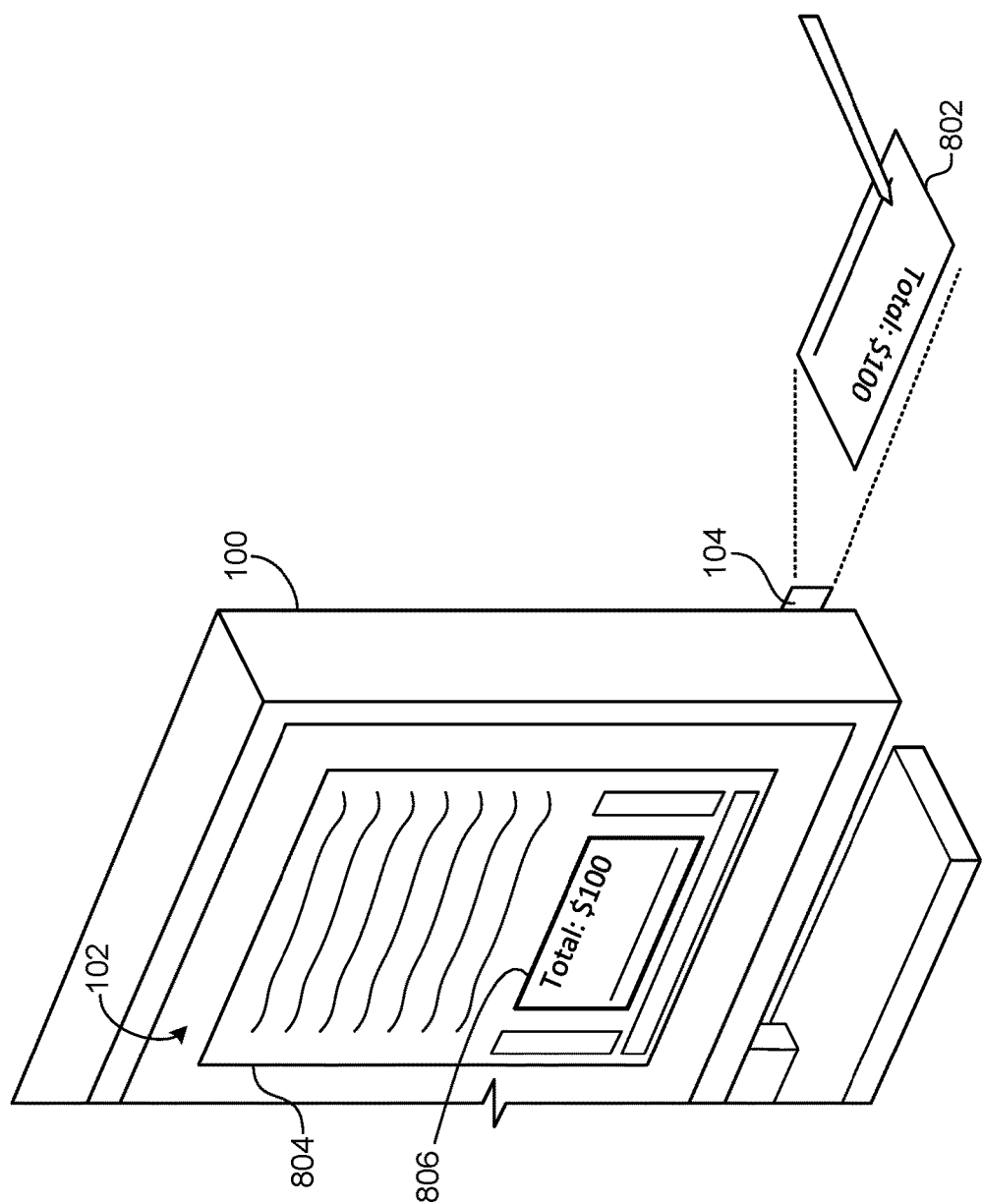
FIG. 8 illustrates an example manner of rendering redaction-based peripheral display information generated based on intra-document selective content filtering.

FIG. 8 illustrates an example manner of rendering redaction-based peripheral display information 802 generated based on intra-document selective content filtering. In the illustrated example, the redaction-based peripheral display information 802 is projected by the built-in projector 104 while the main screen 102 of the monitor 100 displays a complete version of a corresponding document 804 that includes the redaction-based peripheral display information 802 and other redacted information appearing at top, bottom, and side portions of the document 804 adjacent to the redaction-based peripheral display information 802. In the illustrated example, the redaction-based peripheral display information 802 is an internal windowed portion 806 of the document 804 bound by redacted portions (e.g., a top adjacent portion, a bottom adjacent portion, and/or side adjacent portions) of the document 804 positioned between the internal windowed portion 806 and a document perimeter of the document 804. In the illustrated example of FIG. 8, the displaying of the redaction-based peripheral display information 802 via the built-in projector 104 includes displaying the internal windowed portion 806 of the document 804 via the built-in projector 104 exclusive of the redacted portions of the document 804.

Although the redaction-based peripheral display information 802 is shown as being rendered using the built-in projector 104, in other examples the redaction-based peripheral display information 802 may be rendered by a direct-view peripheral display such as the direct-view peripheral displays 602, 702 of FIGS. 6 and 7. In the illustrated example, the redaction-based peripheral display information 802 is a signature line for payment of a monetary amount. Such example may be used in a point of sale scenario (e.g., a check-out line, a retail/commercial purchasing window/station, etc.). Similar examples of intra-document selective content filtering may also be used in other scenarios to protect confidential contents of information displayed on the main screen 102 and/or the document 804 while providing a party with access to view the redaction-based peripheral display information 802 that is relevant to that party. Such examples may include selectively displaying medical patient information as the redaction-based peripheral display information 802 that corresponds to a present patient without divulging other confidential patient information that is rendered on the main screen 102, selectively displaying contract terms as the redaction-based peripheral display information 802 that correspond to a present party while redacting other confidential contract terms rendered on the main screen 102 that correspond to other non-present parties, and/or selectively displaying any other type of information as the redaction-based peripheral display information 802 while redacting other protected, confidential, or private information that is to be protected from viewing by unintended parties.

The redaction-based peripheral display information 802 may be manually user-selected and/or automatically system-detected using any suitable technique. For example, to manually select the redaction-based peripheral display information 802, a user may draw a peripheral display information box or lasso around a portion of display information that is to be displayed by a peripheral display information (e.g., the peripheral display projector 104 of FIGS. 1 and 8-13 and/or the direct-view peripheral displays 602, 702 of FIGS. 6 and 7). Such peripheral display information box or lasso drawn by the user may operate as the example peripheral display information detection hotzone 1202 described below in connection with FIG. 12 to display information contained therein via peripheral information displays. Additionally or alternatively, to automatically detect the redaction-based peripheral display information 802, a configuration data structure may be used that defines information and/or areas of documents that are to be displayed via peripheral information displays as the redaction-based peripheral display information 802. In some examples, a system-drawn perimeter outline defining a peripheral display information detection hotzone (e.g., substantially similar to the peripheral display information detection hotzone 1202 of FIG. 12) may be used to automatically detect any information located therein as the redaction-based peripheral display information 802.

Figure 9:
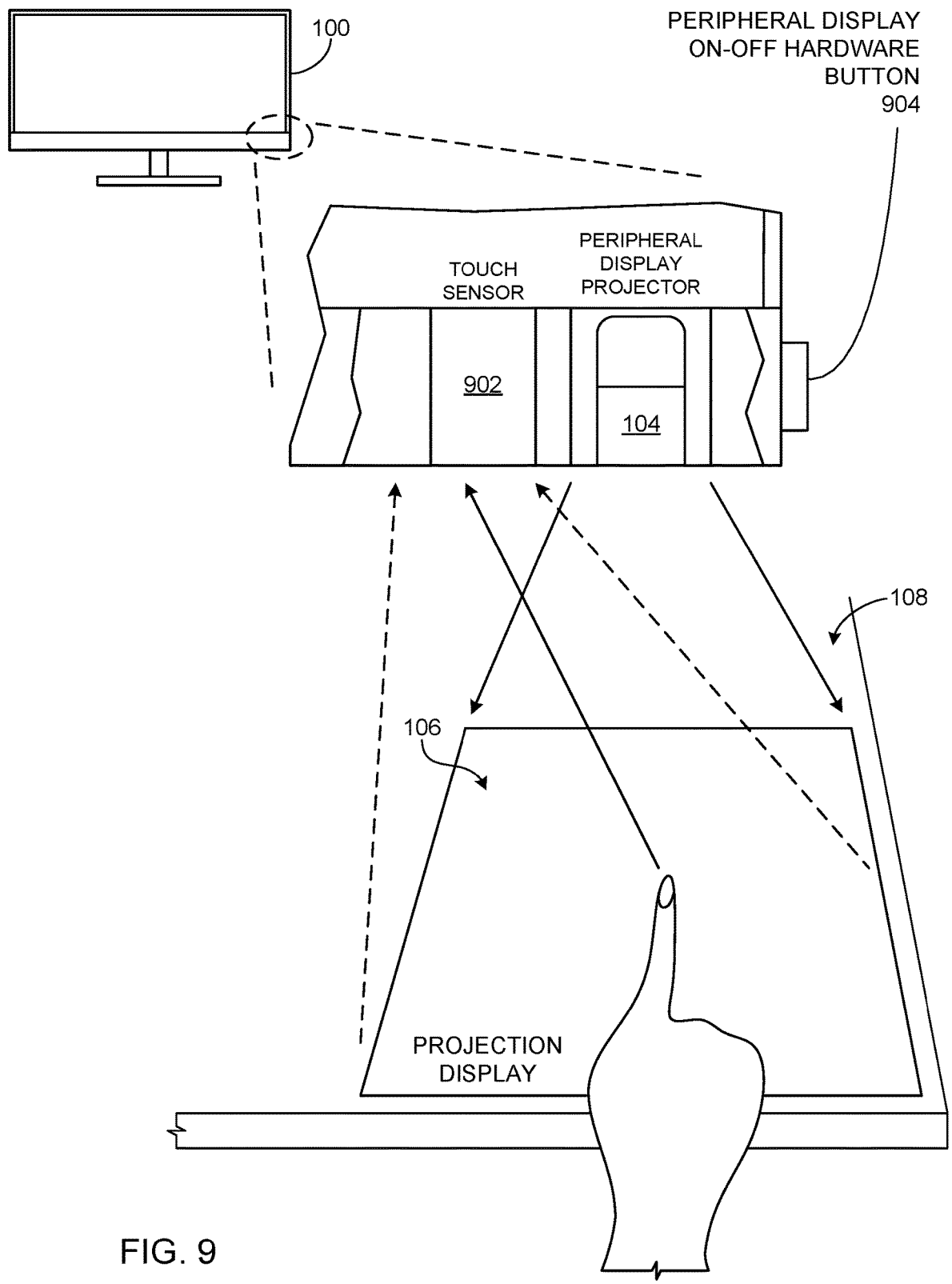
FIG. 9 is an example built-in peripheral display projector and an example touch detector that may be implemented in the example monitor of FIGS. 1-4, 5A, 5B, and 8 to project peripheral display information and to detect touch inputs from a user.

FIG. 9 is an example of the built-in peripheral display projector 104 (FIG. 1) and an example touch sensor 902 built into the example monitor 100 of FIGS. 1-4, 5A, 5B, and 8 to project peripheral display information 106 onto the surface 108 and to detect touch-based user inputs from a user. The example projector 104 may be implemented using a pico projector with an LED light source or a laser light source, or any other suitable type of projector may be used. The example projector 104 is provided with automatic focus capabilities and automatic and/or user-controlled image angle key-stoning capabilities to compensate the projected image for projection angle effects so that the projected image appears squared (e.g., right-angle features are properly displayed as such). The example touch sensor 902 may be implemented using an infrared laser and an image sensor (e.g., a CMOS (complementary metal oxide semiconductor) image sensor or a CCD (charge-coupled device) image sensor). The peripheral display information 106 of the illustrated example is mapped to an x-y coordinate grid by a touch input interface controller (e.g., the touch input interface controller 1522 of FIGS. 15 and 16) and/or a host CPU (e.g., the host CPU 1608 of FIG. 16) to enable detecting user interactions with the peripheral display information 106. As the infrared laser of the example touch sensor 902 is emitted onto the peripheral display information 106, the image sensor of the example touch sensor 902 captures single-finger or multi-finger movements to identify locations and durations of touch-based interactions with the peripheral display information 106. These detected touch-based interactions can then be used to implement real-time user interactions with and updates of the peripheral display information 106. In other examples, any other suitable technologies for detecting touch-based interactions may be used to implement the example touch sensor 902.

In the illustrated example, a peripheral display on-off hardware button 904 is provided to enable a user to manually turn on and turn off the peripheral display projector 104. In some examples, a peripheral display on-off soft button may additionally or alternatively be provided to function the same as the peripheral display on-off hardware button 904. In such examples, the soft button may be displayed on the monitor 100 by an on-screen display (OSD) controller (e.g., the OSD 1514 of FIGS. 15 and 16). In yet other examples, the peripheral display projector 104 may be automatically turned on and turned off based on capabilities to automatically detect peripheral display information that is to be rendered by the peripheral display projector 104. For example, the peripheral display projector 104 may be automatically turned on based on detecting that peripheral display information that is to be projected by the built-in projector 104 is placed in a peripheral display information detection hotzone on the main screen 102 as described below in connection with FIGS. 12 and 13. Alternatively or additionally, the peripheral display projector 104 may be automatically turned on based on detecting the presence or existence of criteria that satisfy a peripheral display information detection definition as described below in connection with FIG. 14.

Figure 10:
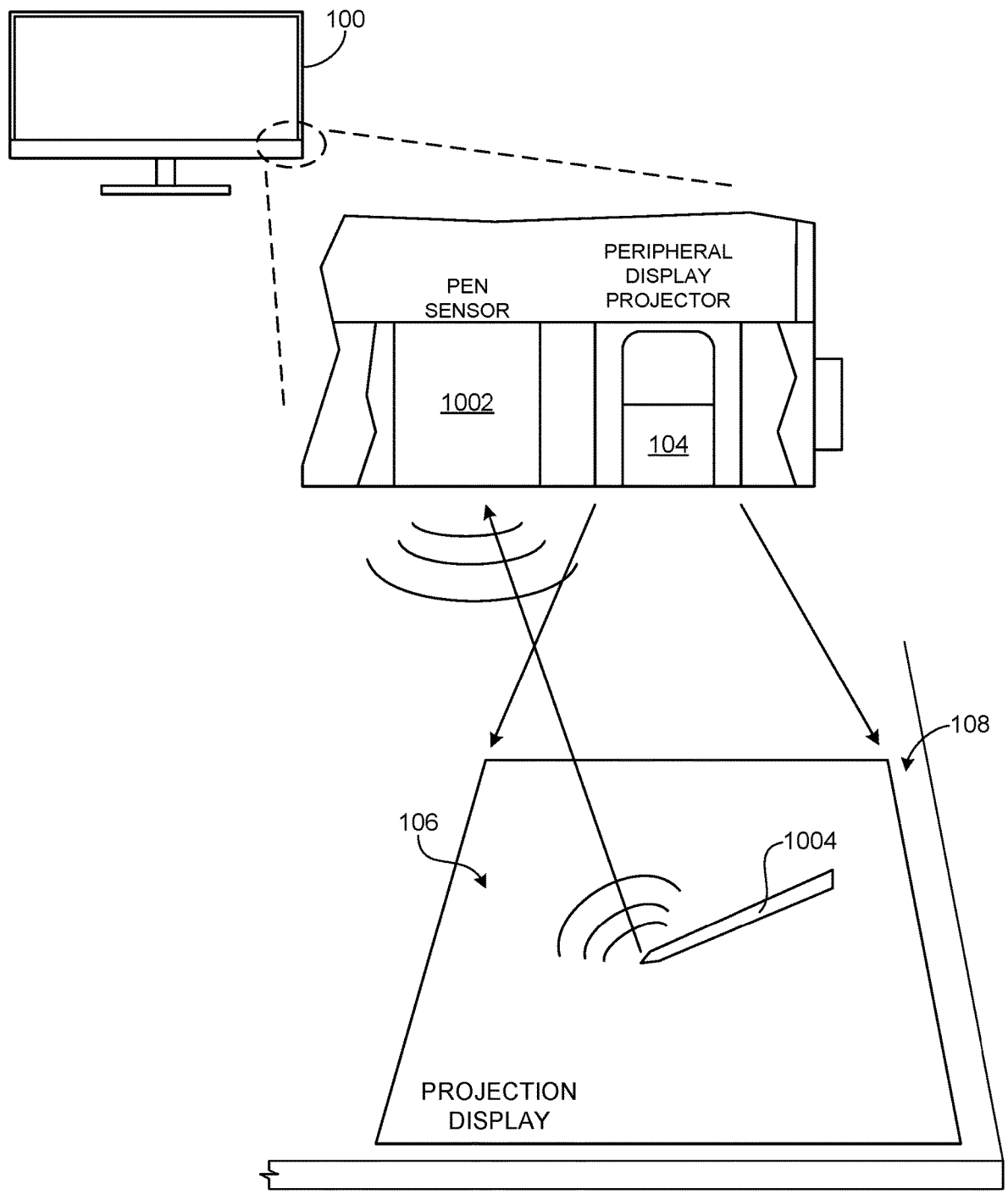
FIG. 10 is an example built-in peripheral display projector and an example pen sensor that may be implemented in the example monitor of FIGS. 1-4, 5A, 5B, and 8 to project peripheral display information and to detect pen inputs from a user.

FIG. 10 is another example of the built-in peripheral display projector 104 (FIG. 1) and an example pen sensor 1002 that may be implemented in the example monitor 100 of FIGS. 1-4, 5A, 5B, and 8 to project peripheral display information 106 onto the surface 108 and to detect pen-based user inputs from a user. In the illustrated example, the pen sensor 1002 is communicatively coupled to a pen (or stylus) 1004 via a short-range wireless protocol (e.g., the Bluetooth® wireless protocol, the Wi-Fi wireless protocol, the ZigBee® wireless protocol, the near-field communication (NFC) wireless protocol, etc.). Communications between the pen sensor 1002 and the pen 1004 enable detecting where the pen 1004 is located and when the pen 1004 selects or presses (e.g., pen down events) on a feature, point, or points on the peripheral display information 106. In some examples, the pen sensor 1002 includes an image sensor (e.g., a CMOS image sensor or a CCD image sensor) to identify locations of the pen 1004 relative to the peripheral display information 106, and a short-range radio interface of the pen sensor 1002 detects pen down events on the peripheral display information 106. The peripheral display information 106 of the illustrated example is mapped to an x-y coordinate grid by a pen input interface controller (e.g., the pen input interface controller 1510 of FIGS. 15 and 16) and/or a host CPU (e.g., the host CPU 1608 of FIG. 16) to enable detecting locations of pen-based interactions with the peripheral display information 106. Detected pen interactions can be used to implement real-time user interactions with and updates of the peripheral display information 106. In other examples, any other suitable technologies for detecting pen interactions may be used to implement the example pen sensor 1002.

Figure 11:
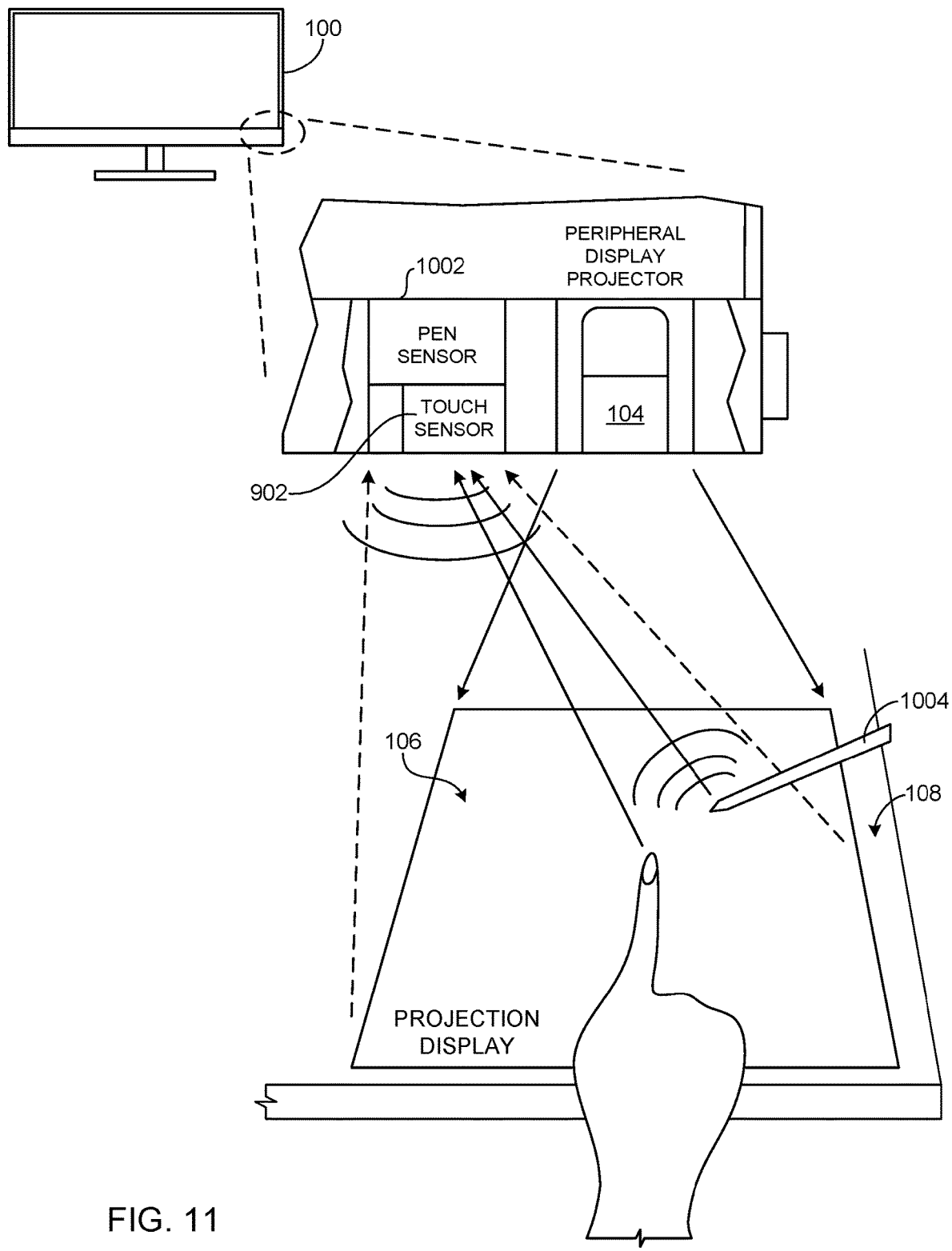
FIG. 11 is an example built-in peripheral display projector in combination with an example touch sensor and an example pen sensor implemented in the example monitor of FIGS. 1-4, 5A, 5B, and 8-11 to project peripheral display information and to detect touch inputs and pen inputs from a user.

FIG. 11 is the example built-in peripheral display projector 104 in combination with the example touch sensor 902 and the example pen sensor 1002 built into the example monitor 100 of FIGS. 1-4, 5A, 5B, and 8 to project the peripheral display information 106 onto the surface 108 and enable user interaction with the peripheral display information 106 by detecting touch-based user inputs and/or pen-based user inputs from a user. The example touch sensor 902 may be implemented as described above in connection with FIG. 9, and the example pen sensor 1002 may be implemented as described above in connection with FIG. 10. In some examples, the touch sensor 902 and the pen sensor 1002 may be activated in a mutually exclusive manner such that when the touch sensor 902 is detecting touch-based user inputs, the pen sensor 1002 does not detect pen-based user inputs, or when the pen sensor 1002 is detecting pen-based user inputs, the touch sensor 902 does not detect touch-based user inputs. In other examples, the touch sensor 902 and the pen sensor 1002 can be simultaneously active to simultaneously detect touch-based user inputs and pen-based user inputs.

FIG. 12 is an example peripheral display information detection hotzone 1202 on the main screen 102 of the example monitor 100 of FIGS. 1-4, 5A, 5B, and 8-11 that may be used to detect peripheral display information 106 in the form of media displayed on the main screen 102. In the illustrated example of FIG. 12, when display information is placed in the peripheral display information detection hotzone 1202, the display information is detected as the peripheral display information 106 and projected by the built-in peripheral display projector 104 (FIGS. 1 and 9-12) onto the surface 108. In some examples, any display information that is placed in the peripheral display information detection hotzone 1202 triggers the built-in peripheral display projector 104 to project it as the peripheral display information 106. In other examples, a user or a system may define particular programs that are to trigger the built-in peripheral display projector 104 to display its rendered contents when windows of those particular programs are placed in the peripheral display information detection hotzone 1202. In some examples, a user may drag or place display information into the peripheral display information detection hotzone 1202 when desiring to digitally ink or markup the contents, then drag or move the display information to another part of the main screen 102 outside of the peripheral display information detection hotzone 1202 for subsequent viewing via the main screen 102.

In some examples, a user may drag a window to the peripheral display information detection hotzone 1202. In instances that the peripheral display information detection hotzone 1202 is smaller than the window, the window shrinks to the size of the peripheral display information detection hotzone 1202 on the main screen 102, and the window contents are displayed as the peripheral display information 106. Alternatively, instead of the window shrinking, only a portion of the window is displayed in the peripheral display information detection hotzone 1202, while the remainder of the window outside the peripheral display information detection hotzone 1202 is hidden from the main screen, but the full window is projected by the built-in peripheral display projector 104 and displayed as the peripheral display information 106. For example, the window may "snap" to the peripheral display information detection hotzone 1202 and then be displayed by the built-in peripheral display projector 104.

FIG. 13 is another example peripheral display information detection hotzone 1302 on the main screen 102 of the example monitor 100 that may be used to detect peripheral display information based on icons 1304 corresponding to computer files. In the illustrated example of FIG. 13, when an icon 1304 is placed in the peripheral display information detection hotzone 1302, a comparison 1306 is performed between the icon 1304 in the peripheral display information detection hotzone 1302 and example reference icons 1308 in an example icon detection bank 1310 to determine whether information in a file corresponding to the icon 1304 is to be displayed by the built-in peripheral display projector 104. In the illustrated example of FIG. 13, a match between the icon 1304 in the peripheral display information detection hotzone 1302 and one of the reference icons 1308 triggers the built-in peripheral display projector 104 to project information in the file corresponding to the icon 1304 as the peripheral display information 106 onto the surface 108. The example comparison operation 1306 may be performed by the monitor 100 and/or a host (e.g., the host processor system 1606 of FIG. 16). The example reference icons 1308 may be specified by a user as icons that, when placed in the peripheral display information detection hotzone 1302, trigger the built-in peripheral display projector 104 to project the peripheral display information 106. In some examples, a user may drag or place an icon 1304 into the peripheral display information detection hotzone 1302 when desiring to digitally ink or markup the contents of a corresponding file, then drag or move the icon 1304 to another part of the main screen 102 when finished.

In some examples, file extensions may be used to identify when and how to display contents of files associated with icons 1304 dragged into the peripheral display information detection hotzone 1302. For example, a user may drag an icon 1304 to the peripheral display information detection hotzone 1302, and the file extension of the file associated with the icon is analyzed to determine whether to display the contents of the file and determine the program to use for displaying the contents of the file.

The example peripheral display information detection hotzones 1202, 1302 are outlined on the main screen 102 using a visible perimeter outline which is shown in the illustrated example as a dashed line. In the illustrated example, the perimeter outline defining the peripheral display information detection hotzones 1202, 1302 is implemented in a frame buffer (e.g., the main frame buffer 1526 of FIG. 15) of the monitor 100 or of a host (e.g., the host processor system 1606 of FIG. 16). For example, when implemented in the monitor 100, the monitor 100 inserts the perimeter outline data in corresponding pixel locations of its frame buffer overlaying main display information received from the host. Alternatively, when implemented in the host, the host inserts the perimeter outline data in corresponding pixel locations of its frame buffer overlaying main display information. In the illustrated example, the perimeter outline defining the peripheral display information detection hotzones 1202, 1302 is implemented using a transparency property so that underlying main display information on the main screen 102 can be seen through the perimeter outline. In this manner, the transparency property of the perimeter outline of the peripheral display information detection hotzones 1202, 1302 can be controlled to reduce interference or distraction from the main display information displayed via the main screen 102. The monitor 100 and/or the host can perform alpha blending between the perimeter outline and the underlying main display information received from the host based on the transparency setting of the peripheral display information detection hotzones 1202, 1302.

Although the examples of FIGS. 12 and 13 are shown in connection with the built-in peripheral display projector 104, in other examples, the peripheral display information detection hotzones 1202, 1302 may be used to detect peripheral display information 106 to be rendered using direct-view peripheral displays (e.g., direct-view peripheral displays 602, 702 of FIGS. 6 and 7). In addition, the peripheral display information detection hotzones 1202, 1302 of the illustrated example can be enabled and disabled manually and/or automatically. For example, the peripheral display information detection hotzones 1202, 1302 may be enabled (e.g., made visible and operational) based on a user depressing the peripheral display on-off hardware button 904 (FIG. 9) or a soft button to turn on the peripheral display projector 104 (or to turn on direct-view peripheral information displays 602, 702 of FIGS. 6 and 7). The peripheral display information detection hotzones 1202, 1302 may be disabled (e.g., not displayed and not operational) based on a user depressing the peripheral display on-off hardware button 904 or a soft button to turn off the peripheral display projector 104 (or to turn off direct-view peripheral information displays 602, 702 of FIGS. 6 and 7).

FIG. 14 is an example data structure 1400 shown in the form of a table that stores peripheral display information detection definitions 1402 that define criteria that trigger displaying of peripheral display information 106 via peripheral display devices (e.g., the peripheral display projector 104 of FIGS. 1 and 8-13 and/or the direct-view peripheral displays 602, 702 of FIGS. 6 and 7). Example criteria in an example criteria column 1404 of the peripheral display information detection definitions 1402 may define properties or characteristics of files, programs, user interface windows/frames, etc. of which contents are to be automatically displayed via peripheral display devices when such defined properties or characteristics are present or actively displayed on the main screen 102 of the monitor 100. Additionally or alternatively, the example criteria in the example criteria column 1404 may define user inputs (e.g., pressing of key combinations, touch gestures, pen gestures, mouse gestures, pressing of hardware buttons and/or soft buttons, etc.) that trigger displaying of corresponding programs/apps and/or files. In some examples, the criteria in the example criteria column 1404 defines a peripheral display information hotzone (e.g., the peripheral display information detection hotzones 1202, 1302 of FIGS. 12 and 13) as a trigger for displaying peripheral display information.

An example program column 1406 of FIG. 14 defines programs/apps that are to be used for accessing peripheral display information to be displayed based on corresponding criteria in the criteria column 1404. An example file column 1408 of FIG. 14 defines filenames of files of which contents are to be displayed as peripheral display information based on corresponding criteria in the criteria column 1404. An example peripheral display(s) column 1410 of FIG. 14 defines peripheral display device identifiers of peripheral display devices (e.g., the peripheral display projector 104 of FIGS. 1 and 8-11 and/or the direct-view peripheral displays 602, 702 of FIGS. 6 and 7) that are to be used to display peripheral display information based on corresponding criteria in the criteria column 1404.

The peripheral display information detection definitions 1402 may be system defined and/or user defined. For example, a computer system may be programmed with default criteria that trigger displaying corresponding programs as peripheral display information via peripheral display devices. In some examples, when a program is installed on the computer system, the installation process automatically creates a peripheral display information detection definition 1402 to trigger displaying of the program as peripheral display information. Alternatively, a user-defined peripheral display information detection definition 1402 may be configured by a user by defining criteria that trigger the displaying of a corresponding program and/or file as peripheral display information.

In the illustrated example of FIG. 14, a peripheral display information detection definition 1402a is defined to trigger the built-in peripheral display projector 104 to display the contents of a file named TemplateABC.ppt using a program named "slides" when a particular key combination is pressed by a user. An example peripheral display information detection definition 1402b is defined to trigger one of the direct-view peripheral information displays 602, 702 (FIGS. 6 and 7) identified as "DirectView1" to display a "phone" program user interface when a corresponding defined key combination is pressed. An example peripheral display information detection definition 1402c is defined to trigger one of the direct-view peripheral information displays 602, 702 (FIGS. 6 and 7) identified as "DirectView2" to display a "calendar" program user interface when defined window properties (WndProp[. . . ]) of the "calendar" program are satisfied. For example, the window properties of the example peripheral display information detection definition 1402c may define that when the "calendar" program window is minimized onto a user interface toolbar, or is made to be smaller than a defined x-y dimension, or is not the focus of user interaction (e.g., a different window is in active focus mode), the "DirectView2" peripheral information display is to display the contents of the "calendar" program, or a particular view (e.g., a monthly view, a daily agenda view, etc.) of the "calendar" program.

An example peripheral display information detection definition 1402d is defined to trigger one of the direct-view peripheral information displays 602, 702 (FIGS. 6 and 7) identified as "DirectView3" to display a "music" program user interface when the "music" program is initialized/launched. An example peripheral display information detection definition 1402e is defined to trigger an available one of the direct-view peripheral information displays 602, 702 (FIGS. 6 and 7) identified as "DirectView1" or "DirectView2" to display an instant messenger (IM) program. For example, if the direct-view peripheral information display identified as "DirectView1" is occupied with displaying other peripheral display information, the direct-view peripheral information display identified as "DirectView2" is used to display the "IM" program. In some cases where both of the direct-view peripheral information displays identified as "DirectView1" and "DirectView2" are occupied displaying other peripheral display information, a user interface may be displayed on the main screen 102 requesting user input regarding which of the displays to use. An example peripheral display information detection definition 1402f is defined to trigger an available one of the direct-view peripheral information displays 602, 702 (FIGS. 6 and 7) identified as "DirectView1" or "DirectView2" or "DirectView3" to display a "notifications" center. An example peripheral display information detection definition 1402g is defined to trigger the built-in peripheral display projector 104 to display an "art" program when, for example, a window of the "art" program is placed in the peripheral display information detection hotzones 1202 as described above in connection with FIG. 12, or an icon of the "art" program is placed in the peripheral display information detection hotzones 1302 as described above in connection with FIG. 13.

Additional criteria that may trigger displaying peripheral display information on peripheral information displays is whether a program includes low-resolution GUI windows. For example, an initialized or launched program that has been compiled to include low-resolution GUIs for displaying via a low-resolution peripheral information display may be defaulted to display on a peripheral information display. In some examples, criteria may additionally or alternatively include a program's properties having permissions to display on a lower-quality display (e.g., displays with lower resolution, lower gamut, lower contrast levels, etc.).

Figure 15:
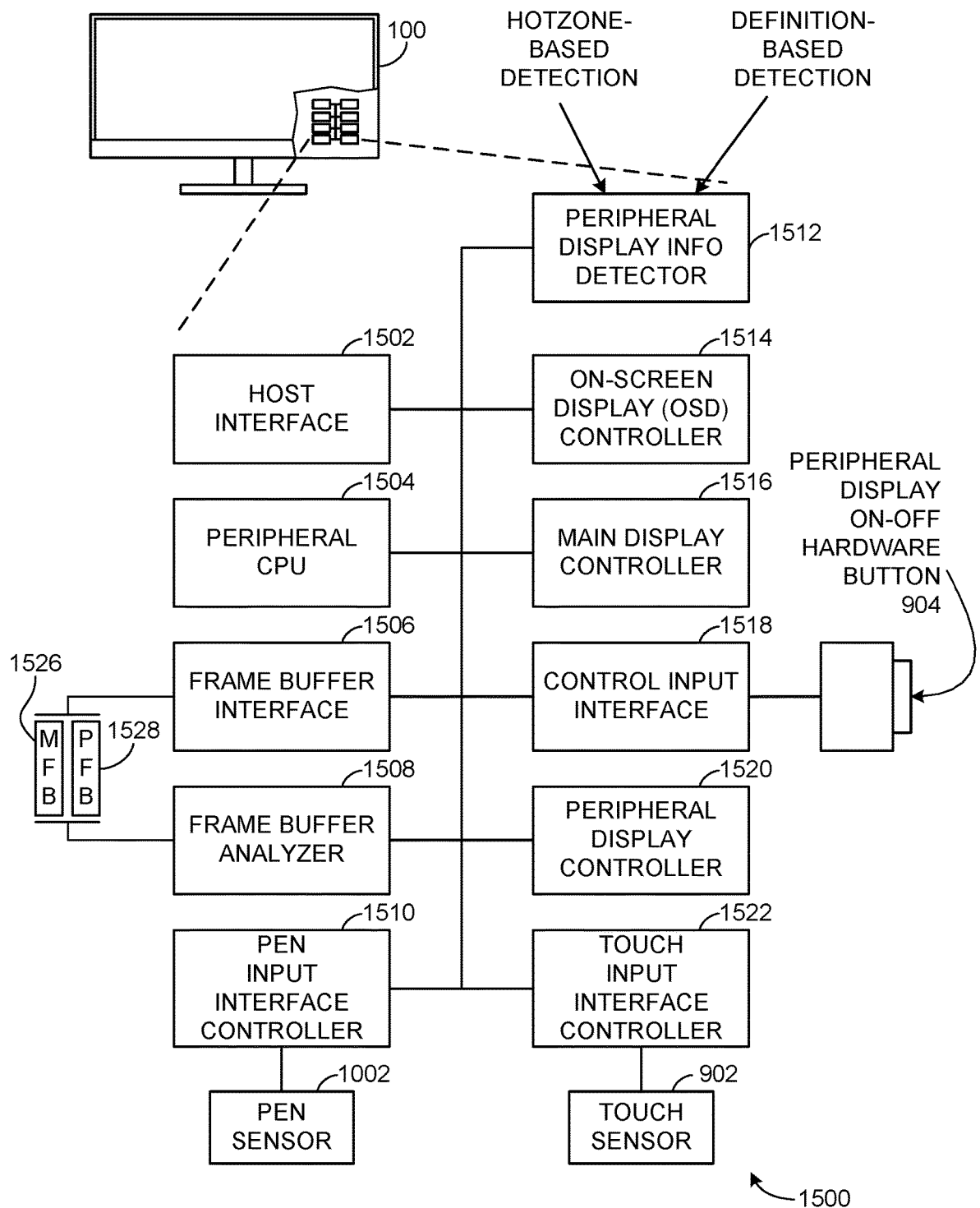
FIG. 15 is an example apparatus built into the example monitor of FIGS. 1-4, 5A, 5B, and 8-13 that includes a number of components to detect, generate, and/or display peripheral display information in accordance with the teachings of this disclosure.

FIG. 15 is an example apparatus 1500 built into the example monitor 100 of FIGS. 1-4, 5A, 5B, and 8-13 that includes a number of components to detect, generate, and/or display peripheral display information in accordance with the teachings of this disclosure. In the illustrated example of FIG. 15, the apparatus 1500 controls operations to implement examples disclosed herein to present peripheral display information via peripheral information displays (e.g., the peripheral display projector 104 of FIGS. 1 and 8-13 and/or the direct-view peripheral displays 602, 702 of FIGS. 6 and 7). The example apparatus 1500 includes an example host interface 1502, an example peripheral CPU 1504, an example frame buffer interface 1506, an example frame buffer analyzer 1508, an example pen input interface controller 1510, an example peripheral display information detector 1512, an example on-screen display (OSD) controller 1514, an example main display controller 1516, an example control input interface 1518, an example peripheral display controller 1520, and an example touch input interface controller 1522. The components may be implemented via hardware using logic circuits, controller(s), and/or processor(s) provided on a printed circuit board (PCB) in the monitor 100. Additionally or alternatively, the components may be implemented via firmware and/or software to be executed by controller(s) and/or processor(s) of the monitor 100.

Figure 16:
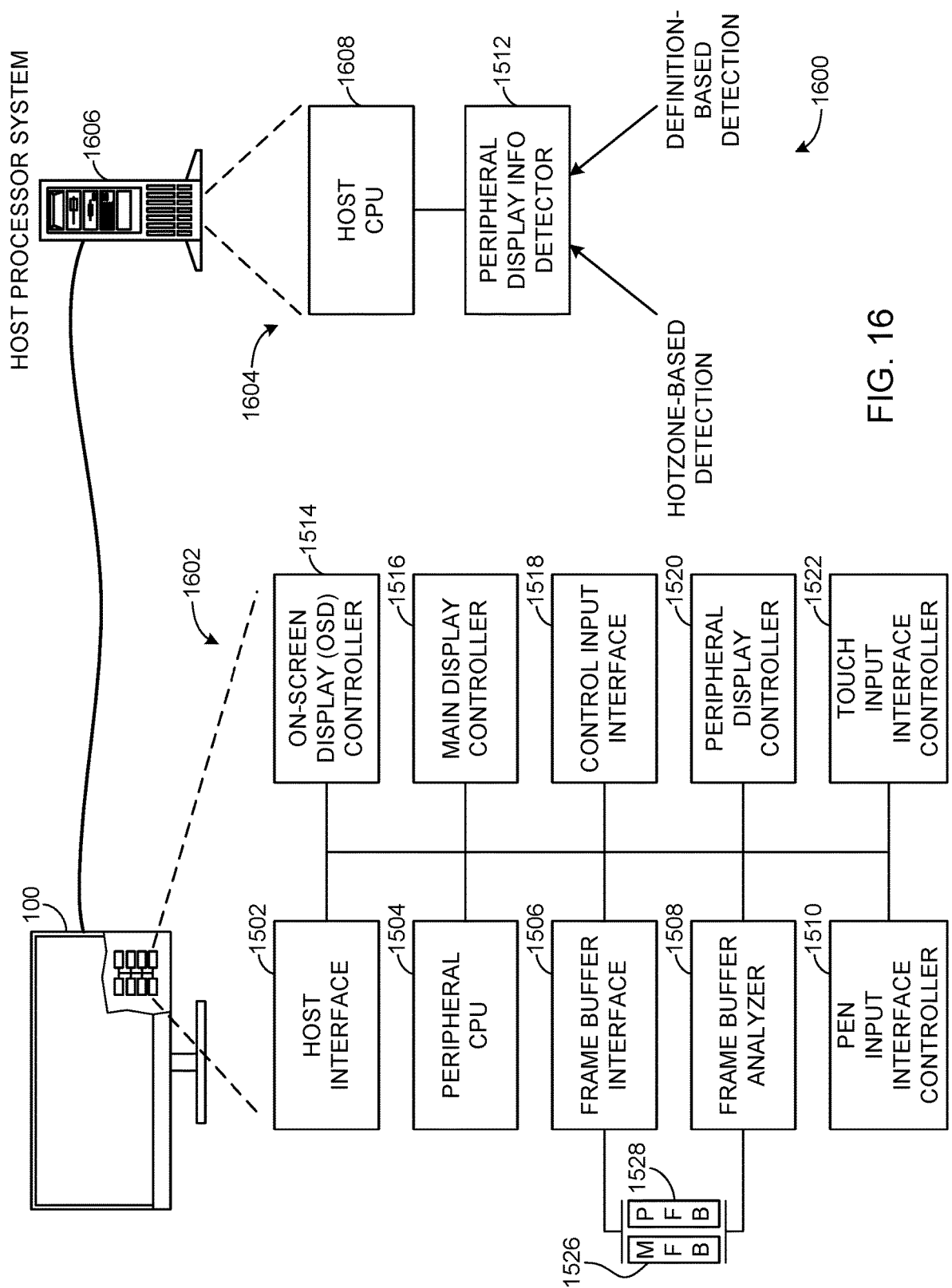
FIG. 16 is an example system that includes a built-in monitor apparatus in the example monitor of FIGS. 1-4, 5A, 5B, and 8-13 in communication with a host apparatus in a host processor system that include a number of components to detect, generate, and/or display peripheral display information in accordance with the teachings of this disclosure.

The apparatus 1500 is provided with the example host interface 1502 to communicate with a host computer system (e.g., the host processor system 1606 of FIG. 16). For example, the host interface 1502 receives display information to display via the main screen 102 of the monitor 100 and/or via peripheral information displays. The example host interface 1502 may also be used to notify the host computer system when display information or file/program icons (e.g., the icons 1304 of FIG. 13) are placed in the peripheral display information detection hotzones 1202, 1302 as described above in connection with FIGS. 12 and 13. The example host interface 1502 may also be used to send touch-based and/or pen-based user interaction information to the host processor system so that the host processor system can control program operation and/or update contents of peripheral display information based on such user inputs. For example, markups or modifications made to the peripheral display information may be saved by the host processor system in corresponding files in a memory or storage device of the host processor system. In response to the user interactions, the host processor system can return updated peripheral display information from the host processor system to the monitor 100 for displaying as updated peripheral display information.

The apparatus 1500 is provided with the example peripheral CPU 1504 to control operations of the monitor 100 to display information on the main screen 102 and/or to control rendering of peripheral display information via peripheral information displays. The apparatus 1500 is provided with the example frame buffer interface 1506 to access (e.g., write and/or read) display information in an example main frame buffer (MFB) memory 1526 and/or an example peripheral frame buffer (PFB) memory 1528 of the monitor 100. For example, the frame buffer interface 1506 may write display information received from a host processor system via the host interface 1502 into the main frame buffer memory 1526 and/or read display information from the main frame buffer memory 1526 for rendering on the main screen 102. In some examples, the main frame buffer memory 1526 also stores peripheral display information that overlaps or is a subset (less than the entirety of) the display information displayed on the main screen 102. In such examples, the peripheral display information is stored in a designated peripheral display area which is a sub-area of the main frame buffer memory 1526, and the sub-area covers less than an entirety of the main screen 102. As such, the frame buffer interface 1506 accesses the peripheral display information from the main frame buffer memory 1526 as less than the entirety of the display information in the main frame buffer memory 1526 for displaying via peripheral information displays. Additionally or alternatively, in some examples, the frame buffer interface 1506 may write peripheral display information received from a host processor system via the host interface 1502 into the peripheral frame buffer memory 1528 and/or read peripheral display information from the peripheral frame buffer memory 1528 for rendering via peripheral information displays.

The apparatus 1500 is provided with the example frame buffer analyzer 1508 to analyze data in the main frame buffer memory 1526 for the presence of display information or program icons (e.g., the icons 1304 of FIG. 13) in the peripheral display information detection hotzone 1202, 1302. To determine when such display information and/or program icons in the peripheral display information detection hotzone 1202, 1302 is/are to trigger displaying corresponding peripheral display information via peripheral information displays, the apparatus 1500 is provided with the example peripheral display information detector 1512. For example, the peripheral display information detector 1512 can compare display information to criteria of peripheral display information detection definitions 1402 of FIG. 14 and/or can compare program and/or file icon(s) to the reference icons 1308 in the icon detection bank 1310 of FIG. 13 to determine whether the display information and/or program/file icon(s) trigger(s) the presenting of corresponding peripheral display information. The example peripheral display information detector 1512 is also provided to perform definition-based detection by comparing user inputs, program properties, and/or window properties to criteria of peripheral display information detection definitions 1402 of FIG. 14 to determine when corresponding peripheral display information is triggered for presenting via peripheral information displays.

The apparatus 1500 is provided with the example pen input interface controller 1510 to detect pen-based user inputs as described above in connection with FIGS. 10 and 11. In the illustrated example, the pen input interface controller 1510 is in circuit with the example pen sensor 1002. The apparatus 1500 is provided with the example touch input interface controller 1522 to detect touch-based user inputs as described above in connection with FIGS. 9 and 11. In the illustrated example, the touch input interface controller 1522 is in circuit with the example touch sensor 902.

The apparatus 1500 is provided with the example OSD controller 1514 to display graphical user interface (GUI) information and controls regarding operations and features of the monitor 100. For example, the OSD controller 1514 can display brightness settings, color settings, sharpness settings, etc. and user interface controls to adjust such settings. In the illustrated example, the OSD controller 1514 is also configured to display features related to displaying peripheral display information as disclosed herein. For example, the OSD controller 1514 displays the perimeter outline to show the peripheral display information detection hotzone 1202, 1302 (FIGS. 12 and 13) on the main screen 102 and performs alpha blending based on a transparency setting for the perimeter outline to not obscure underlying display information from a host computer system that is also being displayed on the main screen 102. The example OSD controller 1514 may also display additional information such as prompting for user input on which peripheral information display should be used to present peripheral display information.

The apparatus 1500 is provided with the example main display controller 1516 to control operations of the main screen 102. For example, the main display controller 1516 controls timing and rendering of display information from the main frame buffer memory 1526 onto the main screen 102. The display information includes graphics information received from a host computer system and stored in the main frame buffer memory 1526 and includes display information to implement examples disclosed herein such as graphics, text, or other GUIs overlaid on display information in the main frame buffer memory 1526 by the OSD controller 1514. Such overlaid information includes perimeter outlines to show the peripheral display information detection hotzone 1202, 1302 of FIGS. 12 and 13.

The apparatus 1500 is provided with the example control input interface 1518 to receive user inputs from hardware buttons on the monitor 100. For example, the control input interface 1518 is shown in circuit with the peripheral display on-off hardware button 904. In addition, the example control input interface 1518 can be in circuit with other hardware buttons such as menu control buttons, video source selection buttons, a monitor on-off button, volume buttons, etc. of the monitor 100.

The apparatus 1500 is provided with the example peripheral display controller 1520 to control operations of peripheral information displays (e.g., the peripheral display projector 104 of FIGS. 1 and 8-13 and/or the direct-view peripheral displays 602, 702 of FIGS. 6 and 7). For example, the peripheral display controller 1520 controls timing and rendering of peripheral display information from a designated peripheral display area of the main frame buffer memory 1526 and/or from the example peripheral frame buffer memory 1528 via peripheral information displays. In some examples, the peripheral display controller 1520 also controls when to cease displaying peripheral display information via peripheral information displays. For example, the peripheral display controller 1520 may selectively turn off different ones of the peripheral information displays and/or may cease sending peripheral information display to selective ones of the peripheral information displays based on user input or system events. For example, the peripheral display controller 1520 may be configured to turn off or cease displaying peripheral display information on the peripheral information displays based on: (a) user inputs such as swipe gestures via touch input or pen input, (b) depressing a hardware button (e.g., the peripheral display on-off hardware button 904), (c) depressing a soft button on a GUI of the main screen 102 or on a peripheral information display, (d) keyboard key combinations, (e) a system-generated event based on detecting a condition (e.g., no longer satisfying criteria of the peripheral display information detection definitions 1402 of FIG. 14) triggering the ceasing of displaying corresponding peripheral display information, and/or (f) any other suitable user input or system event.

FIG. 16 is an example system 1600 that includes an example monitor-based apparatus 1602 in the example monitor 100 of FIGS. 1-4, 5A, 5B, and 8-13 in communication with an example host-based apparatus 1604 in an example host processor system 1606 to present peripheral display information via peripheral information displays (e.g., the peripheral display projector 104 of FIGS. 1 and 8-13 and/or the direct-view peripheral displays 602, 702 of FIGS. 6 and 7) in accordance with the teachings of this disclosure. The example monitor 100 is connected or communicatively coupled via wired or wireless means to the example host 1606 so that components of the monitor-based apparatus 1602 and the host-based apparatus 1604 can work cooperatively to detect, generate, and/or display peripheral display information. The example monitor-based apparatus 1602 includes a subset of components described above in connection with FIG. 15. An example difference is that, in the example of FIG. 16, the peripheral display information detector 1512 is implemented in the host-based apparatus 1604 along with an example host CPU 1608. In this manner, the example peripheral display information detector 1512 can monitor the peripheral display information detection hotzone 1202, 1302 (FIGS. 12 and 13) and/or analyze executions of programs on the host processor system 1606 to detect for the presence of peripheral display information to present via peripheral information displays. The example host CPU 1608 may be implemented by the example processor 2112 of FIG. 21.

In the illustrated example of FIG. 16, to implement the peripheral display information detection hotzones 1202, 1302, the peripheral display information detector 1512 can define corresponding perimeter outlines for a graphics processing unit (GPU) of the host processor system 1606 to draw into a frame buffer memory of the host processor system 1606. The example peripheral display information detector 1512 can define transparency settings so that the GPU can perform corresponding alpha blending of the perimeter outline and underlying main display information to be displayed via the main screen 102 of the monitor 100 to reduce interference or distraction from the underlying main display information. The example peripheral display information detector 1512 can then monitor the frame buffer area within the perimeter outline of the peripheral display information detection hotzone 1202, 1302 to determine when there is peripheral display information present to trigger the displaying of such peripheral display information via peripheral information displays as discussed above in connection with FIGS. 12 and 13. Additionally or alternatively, the example peripheral display information detector 1512 can monitor executions of programs and/or characteristics of GUI windows of executing programs to determine when criteria of the peripheral display information detection definitions 1402 are satisfied to trigger displaying of corresponding peripheral display information via peripheral information displays. When peripheral display information is detected, the peripheral display information detector 1512 can then work with the host CPU 1608 and/or a GPU of the host processor system 1606 to provide the peripheral display information to the monitor-based apparatus 1602 for storing in the peripheral frame buffer memory 1528 and displaying via peripheral information displays.

While an example manner of implementing the apparatus 1500 is shown in FIG. 15, and an example manner of implementing the example apparatus 1602 and the example apparatus 1604 is shown in FIG. 16, the elements, processes and/or devices illustrated in FIGS. 15 and 16 may be combined, divided, re-arranged, omitted, eliminated and/or implemented in any other way. Further, the example host interface 1502, the example peripheral CPU 1504, the example frame buffer interface 1506, the example frame buffer analyzer 1508, the example pen input interface controller 1510, the example peripheral display information detector 1512, the example OSD controller 1514, the example main display controller 1516, the example control input interface 1518, the example peripheral display controller 1520, and the example touch input interface controller 1522 and/or, more generally, the example apparatus 1500, the example apparatus 1602, and/or the example apparatus 1604 may be implemented by hardware, software, firmware and/or any combination of hardware, software and/or firmware. Thus, for example, any of the example host interface 1502, the example peripheral CPU 1504, the example frame buffer interface 1506, the example frame buffer analyzer 1508, the example pen input interface controller 1510, the example peripheral display information detector 1512, the example OSD controller 1514, the example main display controller 1516, the example control input interface 1518, the example peripheral display controller 1520, and the example touch input interface controller 1522 and/or, more generally, the example apparatus 1500, the example apparatus 1602, and/or the example apparatus 1604 could be implemented by analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host interface 1502, the example peripheral CPU 1504, the example frame buffer interface 1506, the example frame buffer analyzer 1508, the example pen input interface controller 1510, the example peripheral display information detector 1512, the example OSD controller 1514, the example main display controller 1516, the example control input interface 1518, the example peripheral display controller 1520, and/or the example touch input interface controller 1522 is/are hereby expressly defined to include a non-transitory computer readable storage device or storage disk such as a memory, a digital versatile disk (DVD), a compact disk (CD), a Blu-ray disk, etc. including the software and/or firmware. Further still, the example apparatus 1500, the example apparatus 1602, and/or the example apparatus 1604 may include elements, processes and/or devices in addition to, or instead of, those illustrated in FIGS. 15 and 16, and/or may include more than one of any or all of the illustrated elements, processes and devices.

Figure 17:
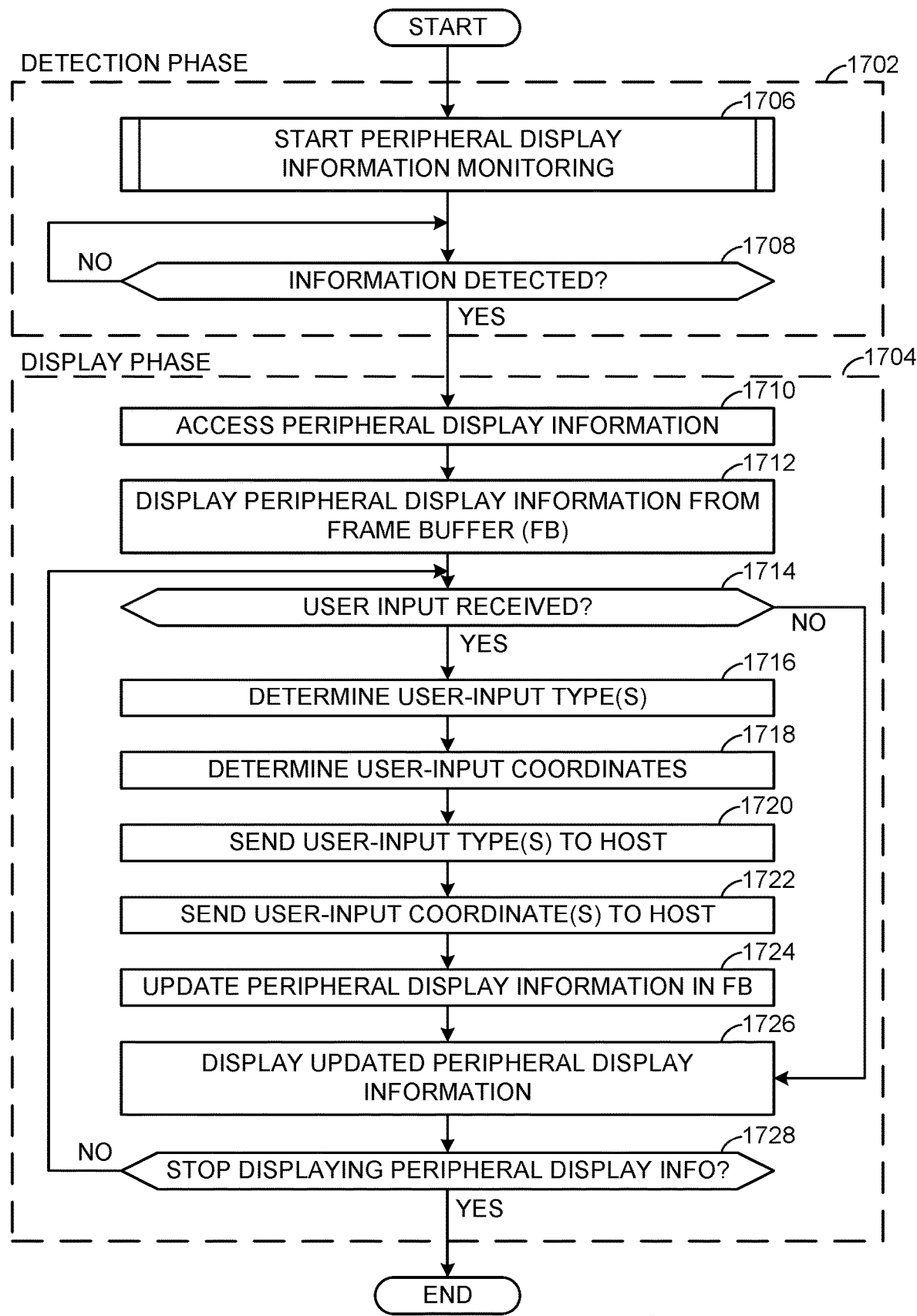
FIG. 17 is an example flowchart representative of computer readable instructions that may be executed to detect, generate, and/or display peripheral display information in accordance with the teachings of this disclosure.
Figure 18:
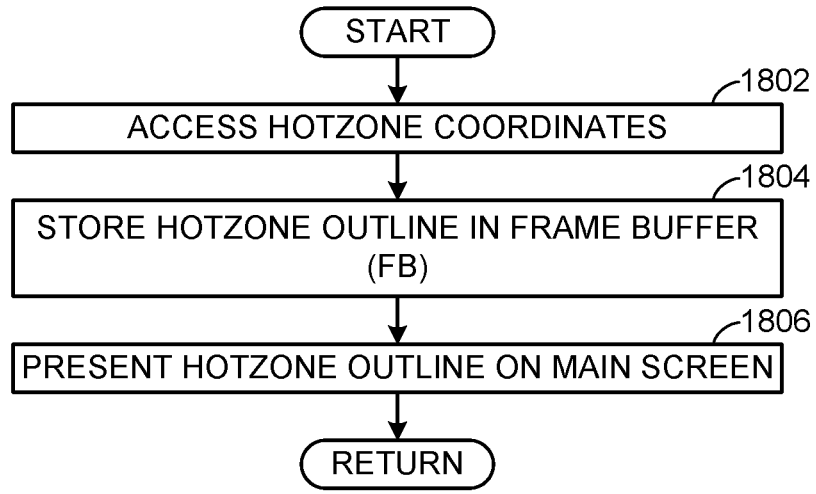
FIG. 18 is an example flowchart representative of computer readable instructions that may be executed to display an example peripheral display information detection hotzone of FIG. 12 and/or FIG. 13 on the example monitor of FIGS. 1-4, 5A, 5B, and 8-13 to trigger displaying peripheral display information in accordance with the teachings of this disclosure.
Figure 19:
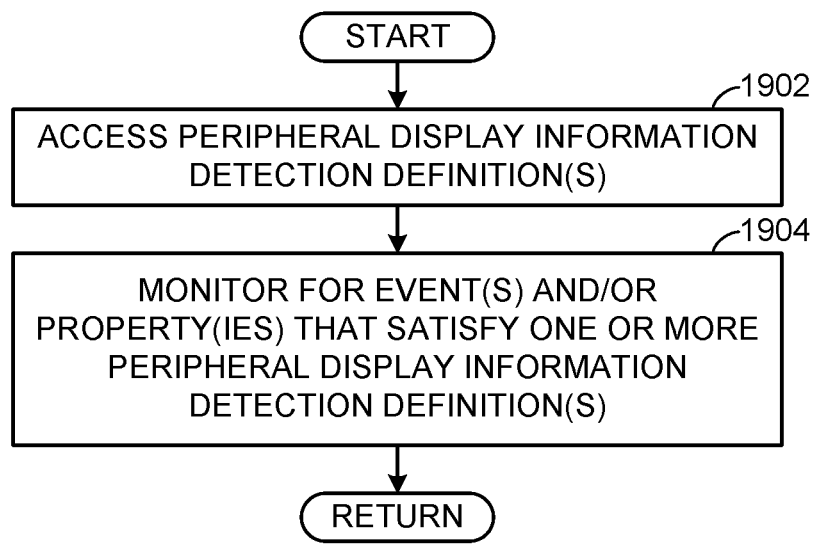
FIG. 19 is an example flowchart representative of computer readable instructions that may be executed to access and use peripheral display information detection definition (s) to trigger displaying peripheral display information in accordance with the teachings of this disclosure.

Flowcharts of FIGS. 17-19 are representative of example machine readable instructions for implementing the example apparatus 1500 of FIG. 15 and/or the example apparatus 1602 and the example apparatus 1604 of FIG. 16. In these examples, the machine readable instructions comprise programs for execution by a processor such as the processor 2112 shown in the example processor platform 2100 discussed below in connection with FIG. 21. The program(s) may be embodied in software stored on a non-transitory computer readable storage medium such as a CD-ROM, a floppy disk, a hard drive, a digital versatile disk (DVD), a Blu-ray disk, or a memory associated with the processor 2112, but the entirety of the program(s) and/or parts thereof could alternatively be executed by a device other than the processor 2112 and/or embodied in firmware or dedicated hardware. Further, although the example program(s) is/are described with reference to the flowcharts illustrated in FIGS. 17-19, many other methods of implementing the example apparatus 1500, the example apparatus 1602, and/or the example apparatus 1604 may alternatively be used. For example, the order of execution of the blocks may be changed, and/or some of the blocks described may be changed, eliminated, or combined. Additionally or alternatively, any or all of the blocks may be implemented by hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 17-19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

FIG. 17 is an example flowchart representative of computer readable instructions that may be executed to implement the example apparatus 1500 of FIG. 15, the monitor-based apparatus 1602 of FIG. 16, and/or the host-based apparatus 1604 of FIG. 16 to detect, generate, and/or display peripheral display information in accordance with the teachings of this disclosure. The example flow chart of FIG. 17 includes an example detection phase 1702 and an example display phase 1704. The example detection phase 1702 includes operations to determine when peripheral display information (e.g., the peripheral display information 106 of FIGS. 1 and 9-13, the peripheral display information presented on the direct-view peripheral information displays 602, 702 of FIGS. 6 and 7, the redaction-based peripheral display information 802 of FIG. 8, etc.) is available for displaying. The example display phase 1704 includes operations to display the detected peripheral display information via peripheral information displays (e.g., the peripheral display projector 104 of FIGS. 1 and 8-13 and/or the direct-view peripheral displays 602, 702 of FIGS. 6 and 7).

The program of FIG. 17 begins at block 1706 of the example detection phase 1702 at which the peripheral display information detector 1512 (FIGS. 15 and 16) starts peripheral display information monitoring (block 1706). Example processes that may be used to implement the operation of block 1706 are described below in connection with FIGS. 18 and 19. The example peripheral display information detector 1512 determines whether peripheral display information has been detected (block 1708). For example, the frame buffer analyzer 1508 may analyze the main frame buffer 1526 (FIGS. 15 and 16) and inform the peripheral display information detector 1512 of the presence of peripheral display information detected based on using a peripheral display information detection hotzone 1202, 1302 as described above in connection with FIGS. 12 and 13.

Alternatively or additionally, the frame buffer analyzer 1508 and/or the peripheral display information detector 1512 may detect the presence of peripheral display information based on criteria that satisfy a peripheral display information detection definition 1402 as described above in connection with FIG. 14. Alternatively or additionally, the frame buffer analyzer 1508 and/or the peripheral display information detector 1512 may detect the presence of redaction-based peripheral display information (e.g., the redaction-based peripheral display information 802 of FIG. 8) as described above in connection with FIG. 8. If peripheral display information is not detected, control remains in the example detection phase 1702 until peripheral display information is detected. Although not shown, in some examples, the detection phase 1702 ceases operation. For example, the detection phase 1702 may stop when the host processor system 1606 is powered off, when a user depresses the peripheral display on-off hardware button 904 (FIGS. 9 and 15) or a peripheral display on-off soft button to turn off a peripheral information display. When the peripheral display information detector 1512 does detect peripheral display information, control advances to the example display phase 1704.

Turning to the example display phase 1704, the frame buffer interface 1506 accesses the peripheral display information in a frame buffer memory (block 1710). In some examples, the frame buffer interface 1506 accesses the peripheral display information in a designated peripheral display area of the main frame buffer memory 1526 (FIGS. 15 and 16) in response to detecting the presence of the peripheral display information at block 1708. In such examples, the designated peripheral display area is a sub-area of the main frame buffer memory 1526, the sub-area covering less than an entirety of the main screen 102 of the monitor 100. In other examples, the frame buffer interface 1506 accesses the peripheral display information in the peripheral frame buffer memory 1528 (FIGS. 15 and 16) in response to detecting the presence of the peripheral display information at block 1708. The peripheral display controller 1520 (FIGS. 15, 16) displays peripheral display information from the frame buffer memory (block 1712). For example, the peripheral display controller 1520 can display the peripheral display information from a designated peripheral display area of the main frame buffer memory 1526 and/or from the peripheral frame buffer memory 1528 via the peripheral display projector 104 of FIGS. 1 and 8-11 and/or the direct-view peripheral displays 602, 702 of FIGS. 6 and 7.

An input interface determines whether user input has been received (block 1714). For example, the pen input interface controller 1510 (FIGS. 15, 16) can detect touch-based user input via the touch sensor 902 and/or the touch input interface controller 1522 (FIGS. 15 and 16) can detect pen-based user input via the pen sensor 1002. The input interface determines the user-input type(s) of the detected user input (block 1716). For example, if the pen input interface controller 1510 detects a pen-based input, the pen input interface controller 1510 identifies the user-input type as a pen input type. Additionally or alternatively, if the touch input interface controller 1522 detects a touch-based input, the touch input interface controller 1522 identifies the user-input type as a touch input type. The input interface determines user-input coordinates (block 1718) based on a user interaction with the peripheral display information presented via a peripheral information display device. For example, the pen input interface controller 1510 and/or the touch input interface controller 1522 converts user-input information received via the touch sensor 902 and/or the pen sensor 1002 to x-y user-input coordinates based on an x-y coordinate system mapped to the peripheral display information in a memory and accessible to the pen input interface controller 1510 and/or the touch input interface controller 1522. The example host interface 1502 (FIGS. 15, 16) sends the user-input type(s) to the host processor system 1606 (FIG. 16) (block 1720). The example host interface 1502 sends the user-input coordinates to the host processor system 1606 (block 1722). For example, the host processor system 1606 may use the user-input type(s) and/or user-input coordinates to determine markups and/or modifications made to the peripheral display information and to save such markups and/or modifications in a corresponding file in a memory or storage device of the host processor system 1606.

The example frame buffer interface 1506 updates the peripheral display information in frame buffer memory (block 1724). For example, the frame buffer interface 1506 receives updated peripheral display information from the host processor system 1606 via the host interface 1502, and stores the received updated peripheral display information in a designated peripheral display area of the main frame buffer memory 1526 and/or in the peripheral frame buffer memory 1528. The example peripheral display controller 1520 displays the updated peripheral display information (block 1726). For example, the peripheral display controller 1520 displays the updated peripheral display information from the designated peripheral display area of the main frame buffer memory 1526 and/or from the peripheral frame buffer memory 1528 via peripheral information displays.

The example peripheral display controller 1520 determines whether to stop displaying peripheral display information (block 1728). For example, the peripheral display controller 1520 may determine to stop displaying peripheral display information based on user input or system events as described above in connection with FIG. 15. If the example peripheral display controller 1520 determines at block 1728 to not stop displaying the peripheral display information, control returns to block 1714. Otherwise, when the example peripheral display controller 1520 determines at block 1728 to stop displaying peripheral display information, the peripheral display controller 1520 stops displaying the peripheral display information, and the example process of FIG. 17 ends.

FIG. 18 is an example flowchart representative of computer readable instructions that may be executed to display an example peripheral display information detection hotzone 1202, 1302 of FIGS. 12 and FIG. 13 on the example monitor 100 of FIGS. 1-4, 5A, 5B, and 8-13 to trigger displaying peripheral display information. The example program of FIG. 18 may be used to implement the operation of block 1706 of FIG. 17 to start peripheral display information monitoring. The example program of FIG. 18 starts at block 1802 at which the example OSD controller 1514 (FIGS. 15 and 16) accesses hotzone coordinates. For example, the hotzone coordinates correspond to a perimeter outline defining the shape and location of a peripheral display information detection hotzone 1202, 1302 on the main screen 102. The example OSD controller 1514 stores the hotzone outline in the main frame buffer memory 1526 (FIGS. 15 and 16) (block 1804). For example, the OSD controller 1514 stores pixel data forming the perimeter outline of the peripheral display information detection hotzone 1202, 1302 in the main frame buffer memory 1526. In some examples, the OSD controller 1514 also performs alpha blending between the perimeter outline pixels and underlying display information of the main screen 102 based on a transparency parameter setting of the peripheral display information detection hotzone 1202, 1302. The example main display controller 1516 (FIGS. 15 and 16) presents the hotzone outline on the main screen 102 (block 1806). For example, the main display controller 1516 renders display information from the main frame buffer memory 1526 that includes the perimeter outline of the peripheral display information detection hotzone 1202, 1302 on the main screen 102. The example process of FIG. 18 ends, and control returns to a calling function or process such as the example program of FIG. 17.

FIG. 19 is an example flowchart representative of computer readable instructions that may be executed to access and use the peripheral display information detection definitions 1402 (FIG. 14) to trigger displaying peripheral display information. The example program of FIG. 19 may be used to implement the operation of block 1706 of FIG. 17 to start peripheral display information monitoring. The example program of FIG. 19 starts at block 1902 at which the example peripheral display information detector 1512 (FIGS. 15 and 16) accesses the peripheral display information detection definition(s) 1402. For example, the peripheral display information detector 1512 can access the peripheral display information detection definition(s) 1402 from the example data structure 1400 (FIG. 14) stored in a memory. The example peripheral display information detector 1512 monitors for any event(s) and/or property(ies) that satisfy the peripheral display information detection definition(s) 1402 (block 1904). For example, the peripheral display information detector 1512 may monitor for key-combination presses, window properties, initialized programs, and/or any other type of event and/or property that satisfies criteria of the peripheral display information detection definition(s) 1402. The example process of FIG. 19 ends, and control returns to a calling function or process such as the example program of FIG. 17.

Figure 20:
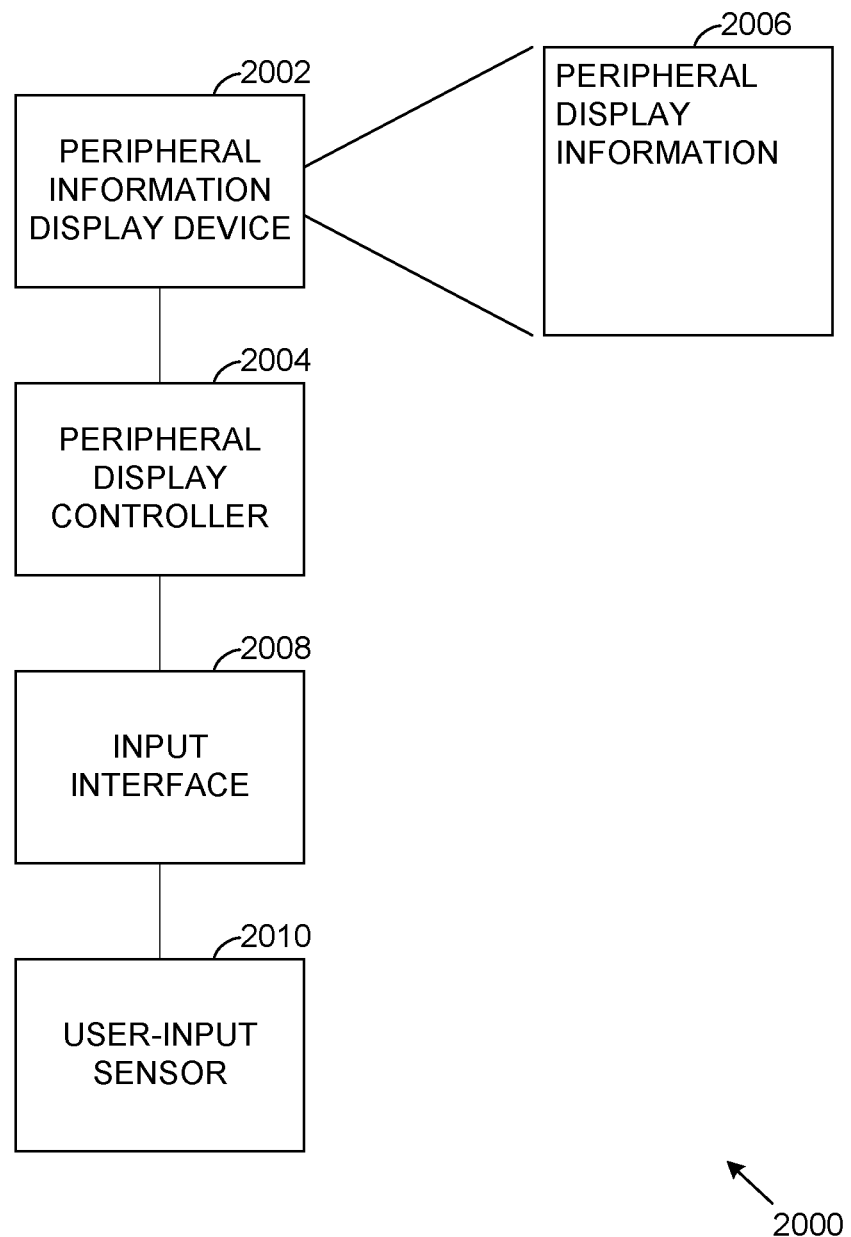
FIG. 20 is another example apparatus including components of the example apparatus of FIGS. 15 and 16 to detect, generate, and/or display peripheral display information in accordance with the teachings of this disclosure.

FIG. 20 is another example apparatus 2000 including components of the example apparatus 1500, 1602, and 1604 of FIGS. 15 and 16 to detect, generate, and/or display peripheral display information in accordance with the teachings of this disclosure. The example apparatus 2000 includes an example peripheral information display device 2002. The example peripheral information display device 2002 is in circuit with the monitor 100 of FIGS. 1-4, 5A, 5B, and 8-13, is separate from the main screen 102 of the monitor 100, and may be implemented by the peripheral display projector 104 of FIGS. 1 and 8-13 and/or the direct-view peripheral displays 602, 702 of FIGS. 6 and 7. The example apparatus 2000 also includes an example peripheral display controller 2004 in circuit with the peripheral information display device 2002. The example peripheral display controller 2004 may be implemented by the peripheral display controller 1520 of FIGS. 15 and 16 and is to access peripheral display information 2006 in a designated peripheral display area of a frame buffer memory (e.g., the main frame buffer memory 1526 and/or the peripheral frame buffer memory 1528 of FIGS. 15 and 16) based on detecting a presence of the peripheral display information. In the illustrated example, the designated peripheral display area is a sub-area of the frame buffer memory corresponding to a perimeter covering less than an entirety of the main screen 102 of the monitor 100. The example peripheral display controller 2004 is also to display, via the peripheral information display device 2002, the peripheral display information 2006 from the designated peripheral display area of the frame buffer memory. The example apparatus 2000 also includes an input interface 2008 in-circuit with a user-input sensor 2010. The input interface 2008 of the illustrated example may be implemented by the pen input interface controller 1510 and/or the touch input interface controller 1522 of FIGS. 15 and 16. The user-input sensor 2010 of the illustrated example may be implemented by the touch sensor 902 of FIGS. 9 and 15 and/or the pen sensor 1002 of FIGS. 10 and 15. The input interface 2008 is to determine user-input coordinates based on a user interaction with the peripheral display information 2006 presented via the peripheral information display device 2002. In the illustrated example of FIG. 20, the peripheral display controller 2004 is to display updated peripheral display information from the designated peripheral display area of the frame buffer memory based on the user interaction with the peripheral display information 2006.

Figure 21:
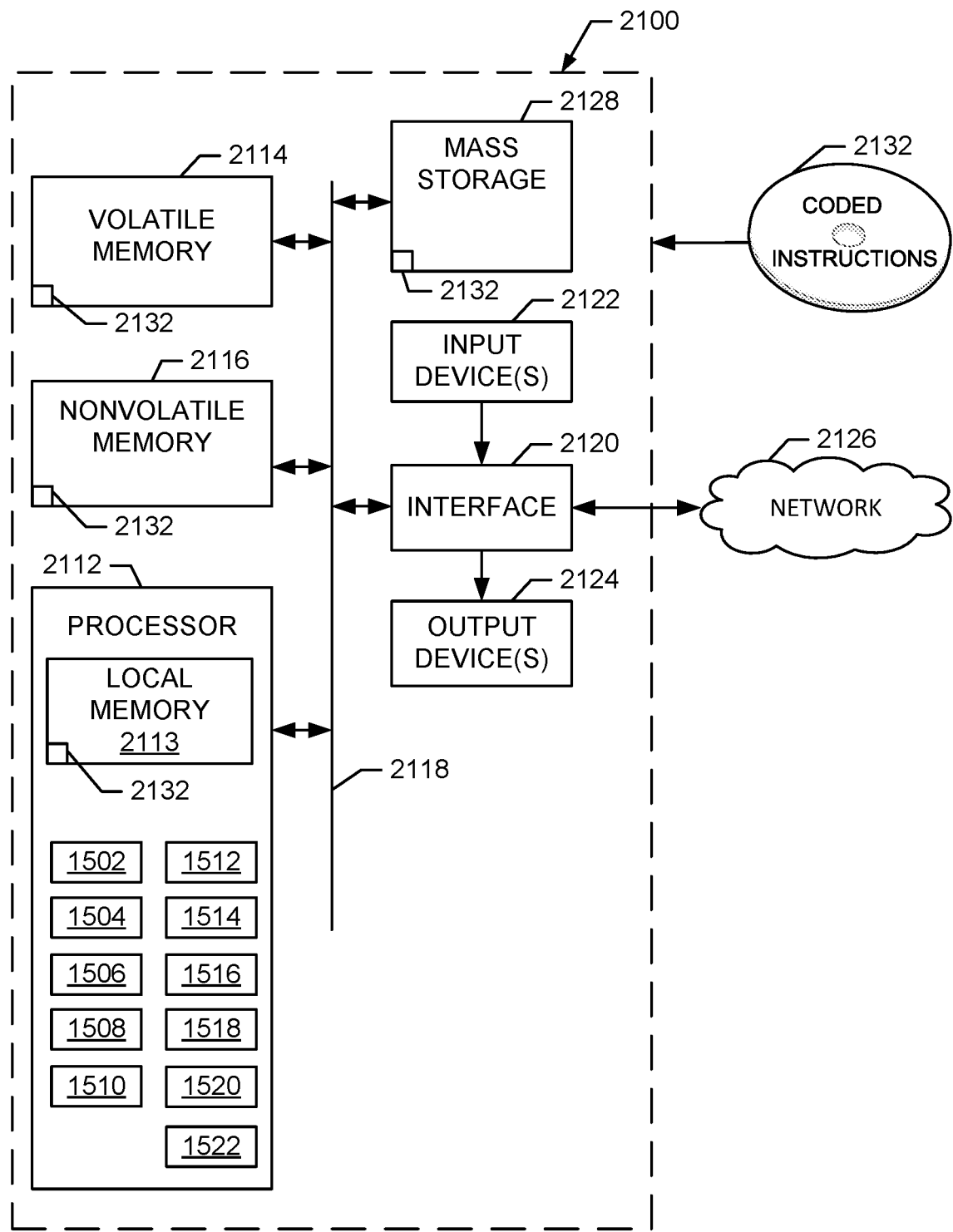
FIG. 21 is an example processor system that may be used to execute the computer readable instructions of FIGS. 17-19 to implement examples disclosed herein to detect, generate, and/or display peripheral display information via peripheral display devices in accordance with the teachings of this disclosure.

FIG. 21 is an example processor system 2100 that may be used to execute the computer readable instructions of FIGS. 17-19 to implement the example apparatus 1500 of FIG. 15 and/or the example apparatus 1602 and the example apparatus 1604 of FIG. 16 to detect, generate, and/or display peripheral display information via peripheral information display devices (e.g., the peripheral display projector 104 of FIGS. 1 and 8-13 and/or the direct-view peripheral displays 602, 702 of FIGS. 6 and 7). The processor platform 2100 can be, for example, a display device, a monitor, a projector, a server, a personal computer, a mobile device (e.g., a cell phone, a smart phone, a tablet such as an iPad™ computing tablet), a personal digital assistant (PDA), an Internet appliance, a DVD player, a CD player, a digital video recorder, a Blu-ray player, a gaming console, a personal video recorder, a set top box, or any other type of computing device.

The processor platform 2100 of the illustrated example includes a processor 2112. The processor 2112 of the illustrated example is hardware. For example, the processor 2112 can be implemented by integrated circuits, logic circuits, microprocessors or controllers from any desired family or manufacturer. The hardware processor may be a semiconductor based (e.g., silicon based) device. In this example, the processor 2112 implements the example host interface 1502, the example peripheral CPU 1504, the example frame buffer interface 1506, the example frame buffer analyzer 1508, the example pen input interface controller 1510, the example peripheral display information detector 1512, the example OSD controller 1514, the example main display controller 1516, the example control input interface 1518, the example peripheral display controller 1520, and the example touch input interface controller 1522.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, input devices 2122 are connected to the interface circuit 2120. The input device(s) 2122 permit(s) a user to enter data and/or commands into the processor 2112. The input device(s) can be implemented by, for example, a pen, a stylus, an audio sensor, a microphone, a camera (still or video), a keyboard, a button, a mouse, a touchscreen, a track-pad, a trackball, isopoint and/or a voice recognition system.

Output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2120 of the illustrated example, thus, may include a graphics driver card, a graphics driver chip and/or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes mass storage device(s) 2128 for storing software and/or data. Examples of such mass storage devices 2128 include floppy disk drives, hard drive disks, compact disk drives, Blu-ray disk drives, RAID systems, and digital versatile disk (DVD) drives.

Example coded instructions 2132 implementing the computer readable instructions represented by the flowcharts of FIGS. 17-19 may be stored in the mass storage device 2128, in the volatile memory 2114, in the non-volatile memory 2116, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to display information from a computer system, comprising:
a peripheral information display device in circuit with a monitor, the monitor having a main screen separate from the peripheral information display device, the main screen defining a display area;
an on-screen display controller to cause a perimeter outline of a peripheral display information detection zone to be displayed within the display area of the main screen of the monitor, the perimeter outline covering less than an entirety of the display area of the main screen;
a peripheral display controller in circuit with the peripheral information display device, the peripheral display controller to:
access peripheral display information in a designated peripheral display area of a frame buffer memory in response to detecting a presence of display information in a main frame buffer memory in the peripheral display information detection zone, the designated peripheral display area being a sub-area of the frame buffer memory corresponding to the perimeter outline; and
cause the peripheral information display device to display the peripheral display information from the designated peripheral display area of the frame buffer memory; and
an input interface in circuit with a user-input sensor, the input interface to determine user-input coordinates based on a user interaction with the peripheral display information presented via the peripheral information display device, the peripheral display controller to cause updated peripheral display information from the designated peripheral display area of the frame buffer memory to be displayed based on the user interaction with the peripheral display information.

2. The apparatus as defined in claim 1, further including a peripheral display information detector to access a peripheral display information detection definition defining at least one of a user interface characteristic, a user input characteristic, a file characteristic, or a program characteristic to trigger the detecting of the presence of the display information, the detecting of the presence of the display information being based on the display information satisfying the peripheral display information detection definition.

3. The apparatus as defined in claim 1, wherein the input interface is further to determine a user-input type of the user interaction with the peripheral display information, and further including a host interface to send the user-input type and the user-input coordinates to the computer system.

4. The apparatus as defined in claim 1, wherein the peripheral display information is redaction-based peripheral display information corresponding to an internal windowed first portion of a document bound by second portions of the document positioned between the internal windowed first portion and a document perimeter of the document, the peripheral display controller to cause the peripheral information display device to display the peripheral display information based on displaying the first portion of the document via the peripheral information display device exclusive of the second portions of the document.

5. The apparatus as defined in claim 1, wherein the peripheral information display device is built into at least one of a housing of the monitor or a base of the monitor.

6. The apparatus as defined in claim 1, wherein the peripheral information display device is built into a keyboard housing.

7. The apparatus as defined in claim 1, wherein the peripheral display information is to be displayed via the peripheral information display device simultaneously with presentation of the display information in the peripheral display information detection zone on the main screen.

8. The apparatus as defined in claim 1, wherein the perimeter outline of the peripheral display information detection zone is to be defined based on a user input.

9. A non-transitory computer readable storage medium comprising instructions that, when executed, cause a processor to at least:
cause a perimeter outline of a peripheral display information detection zone to be displayed within a display region of a main screen of a monitor, the perimeter outline covering less than an entirety of the display area of the main screen;
access peripheral display information in a designated peripheral display area of a frame buffer memory in response to detecting a presence of display information in a main frame buffer in the peripheral display information detection zone, the designated peripheral display area being a sub-area of the frame buffer memory;

cause a peripheral information display device to display the peripheral display information from the designated peripheral display area of the frame buffer memory, the peripheral information display device being separate from the main screen;

update the peripheral display information in the frame buffer memory based on a user interaction with the peripheral display information; and cause the peripheral information display device to display the updated peripheral display information from the designated peripheral display area of the frame buffer memory.

10. The non-transitory computer readable storage medium as defined in claim 9, wherein the instructions, when executed, cause the processor to access a peripheral display information detection definition defining at least one of a user interface characteristic, a user input, a file characteristics, or a program characteristic to trigger the detecting of the presence of the peripheral display information, the detecting of the presence of the peripheral display information being based on the peripheral display information satisfying the peripheral display information detection definition.

11. The non-transitory computer readable storage medium as defined in claim 9, wherein the instructions, when executed, cause the peripheral display information is to be displayed via the peripheral information display device simultaneously with presentation of the display information in the peripheral display information detection zone on the main screen.

12. The non-transitory computer readable storage medium as defined in claim 9, wherein the perimeter outline of the peripheral display information detection zone is to be defined based on a user input.

13. A method to display information from a computer system, comprising:

causing a perimeter outline of a peripheral display information detection zone to be displayed within a display region of a main screen of a monitor, the perimeter outline covering less than an entirety of the display area of the main screen;

accessing peripheral display information in a designated peripheral display area of a frame buffer memory in response to detecting a presence of display information in a main frame buffer memory in the peripheral display information detection zone, the designated peripheral display area being a sub-area of the frame buffer memory;

causing a peripheral information display device to display the peripheral display information from the designated peripheral display area of the frame buffer memory, the peripheral information display device being separate from the main screen;

determining user input coordinates based on a user interaction with the peripheral display information;

sending the user input coordinates to a computer;

updating the peripheral display information from the computer to the frame buffer memory; and causing the updated peripheral display information from the designated peripheral display area of the frame buffer memory to be displayed via the peripheral information display device.

14. The method as defined in claim 13, further including accessing a peripheral display information detection definition defining at least one of a user interface characteristic, a user input, a file characteristics, or a program characteristic to trigger the detecting of the presence of the peripheral display information, the detecting of the presence of the peripheral display information being based on the peripheral display information satisfying the peripheral display information detection definition.

15. The method as defined in claim 13, further including:

determining a user-input type of the user interaction with the peripheral display information; and sending the user-input type with the user input coordinates to the computer.

16. The method as defined in claim 13, wherein the peripheral display information is redaction-based peripheral display information corresponding to an internal windowed first portion of a document bound by second portions of the document positioned between the internal windowed first portion and a document perimeter of the document, the causing of the peripheral information display device to display the peripheral display information includes causing the peripheral information display device to display the first portion of the document exclusive of the second portions of the document.

* * * * *